United States Patent
Jinnai et al.

(10) Patent No.: US 12,247,630 B2
(45) Date of Patent: Mar. 11, 2025

(54) HYDRAULIC CLUTCH, TRAVEL POWER TRANSMISSION DEVICE, AND WORK VEHICLE

(71) Applicant: Kubota Corporation, Osaka (JP)

(72) Inventors: Atsushi Jinnai, Sakai (JP); Tomonari Tsuchida, Sakai (JP); Ryoma Iwase, Sakai (JP); Tomoyuki Tanaka, Sakai (JP); Yoshiki Fujiyama, Sakai (JP); Koki Date, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/740,571

(22) Filed: Jun. 12, 2024

(65) Prior Publication Data
US 2024/0426351 A1 Dec. 26, 2024

(30) Foreign Application Priority Data
Jun. 22, 2023 (JP) ................. 2023-102825

(51) Int. Cl.
*F16D 43/284* (2006.01)
*F16D 25/0638* (2006.01)

(52) U.S. Cl.
CPC ....... *F16D 43/284* (2013.01); *F16D 25/0638* (2013.01)

(58) Field of Classification Search
CPC ....... F16D 13/52; F16D 25/0638; F16D 13/70
See application file for complete search history.

(56) References Cited

U.S. PATENT DOCUMENTS

| | | | |
|---|---|---|---|
| 10,935,083 B2* | 3/2021 | Chae | F16D 25/0638 |
| 11,286,995 B1 | 3/2022 | Ganesan et al. | |
| 2008/0314711 A1* | 12/2008 | Jayaram | F16H 63/3023 |
| | | | 192/85.29 |
| 2013/0075222 A1* | 3/2013 | Ari | F16D 25/12 |
| | | | 137/511 |
| 2017/0241546 A1 | 8/2017 | Sasahara et al. | |
| 2018/0058513 A1* | 3/2018 | Long | F16D 65/186 |
| 2019/0178305 A1* | 6/2019 | Chae | F16H 61/688 |
| 2020/0018393 A1* | 1/2020 | Chae | F16D 25/12 |

FOREIGN PATENT DOCUMENTS

JP       2021-85430 A       6/2021

OTHER PUBLICATIONS

Official Communication issued in corresponding European Patent Application No. 24181607.3, mailed on Nov. 19, 2024, 8 pages.

* cited by examiner

*Primary Examiner* — Stacey A Fluhart
(74) *Attorney, Agent, or Firm* — Keating & Bennett, LLP

(57) ABSTRACT

A hydraulic clutch includes friction plates to transmit motive power, a piston movable between (i) a pressing position, at which the piston presses the friction plates for the hydraulic clutch to be engaged to transmit motive power, and (ii) a separated position, at which the piston is spaced apart from the friction plates for the hydraulic clutch to be disengaged to block motive power, the piston being movable into the pressing position in response to receiving hydraulic fluid to move the piston toward the pressing position, and a holder to (i) hold the piston at an intermediate position between the pressing position and the separated position in response to the piston coming into contact with the holder and (ii) release the piston from the intermediate position.

15 Claims, 6 Drawing Sheets

Fig.8

| | Position of shift pedal 48 as operated ||||||
| --- | --- | --- | --- | --- | --- |
| | Stop position | First-gear range | Second-gear range | Third-gear range | Fourth-gear range |
| Piston 58 and holder 59 of first clutch CL1 | Intermediate position A3, holding position B1 | Pressing position A1, allowing position B2 | Intermediate position A3, holding position B1 | Intermediate position A3, holding position B1 | Separated position A2, allowing position B2 |
| Piston 58 and holder 59 of second clutch CL2 | Intermediate position A3, holding position B1 | Intermediate position A3, holding position B1 | Pressing position A1, allowing position B2 | Intermediate position A3, holding position B1 | Separated position A2, allowing position B2 |
| Piston 58 of third clutch CL3 | Separated position A2 | Separated position A2 | Separated position A2 | Pressing position A1 | Separated position A2 |
| Piston 58 of fourth clutch CL4 | Separated position A2 | Separated position A2 | Separated position A2 | Separated position A2 | Pressing position A1 |

HYDRAULIC CLUTCH, TRAVEL POWER TRANSMISSION DEVICE, AND WORK VEHICLE

CROSS REFERENCE TO RELATED APPLICATIONS

This application claims the benefit of priority to Japanese Patent Application No. 2023-102825 filed on Jun. 22, 2023. The entire contents of this application are hereby incorporated herein by reference.

BACKGROUND OF THE INVENTION

1. Field of the Invention

The present invention relates to hydraulic clutches each including friction plates and a piston, travel power transmission devices including hydraulic clutches, and work vehicles.

2. Description of the Related Art

A hydraulic clutch includes friction plates and a piston. The hydraulic clutch is configured to become engaged to transmit motive power in response to hydraulic fluid being supplied to the piston and the piston being moved into a pressing position at which the piston presses the friction plates. The hydraulic clutch is configured to become disengaged to block motive power in response to hydraulic fluid being discharged and the piston being moved into a separated position at which the piston is spaced apart from the friction plates.

When a hydraulic clutch becomes disengaged, adjacent friction plates may cause friction torque therebetween, causing a motive power loss. To prevent such friction torque (motive power loss), the separated position for the piston is preferably sufficiently far from the friction plates.

On the other hand, when a hydraulic clutch becomes engaged, it may take a long time, if the separated position is excessively far from the friction plates, for the piston to be moved from the separated position into the pressing position, causing a delay in engagement of the hydraulic clutch. To prevent such a delay, the separated position for the piston is preferably sufficiently near the friction plates.

In view of the above conflict, JP 2021-85430 A discloses a hydraulic clutch including a piston placeable at a separated position sufficiently far from the friction plates and also placeable at an intermediate position between the pressing position and the separated position.

When the above hydraulic clutch is kept disengaged, the piston is moved into a separated position sufficiently far from the friction plates and kept therein to reduce or prevent friction torque (motive power loss).

When the hydraulic clutch is engaged, the piston is moved from the separated position into the intermediate position in advance. In response to a subsequent instruction to engage the hydraulic clutch, the piston is moved from the intermediate position into the pressing position. This allows the hydraulic clutch to become engaged responsively.

The hydraulic clutch disclosed in JP 2021-85430 A includes a spring urging the piston toward the separated position. Supplying hydraulic fluid to move the piston toward the pressing position moves the piston toward the pressing position against the spring. This allows the pressure of hydraulic fluid to be balanced with the urging force of the spring to keep the piston at the intermediate position.

However, factors such as a change in the temperature of hydraulic fluid and vibration of the hydraulic clutch will make it difficult to accurately keep the pressure of hydraulic fluid balanced with the urging force of the spring. Even a slight change in the pressure of hydraulic fluid may, as a result, move the intermediate position from an appropriate position toward the pressing position or the separated position.

Such an unstable intermediate position will make it difficult to reduce or prevent friction torque (motive power loss) and allow the hydraulic clutch to become engaged responsively. There is still room for improvement in this regard.

SUMMARY OF THE INVENTION

Example embodiments of the present invention provide hydraulic clutches, travel power transmission devices including hydraulic clutches, and work vehicles, each configured to keep a piston of a hydraulic clutch stably at an intermediate position between a pressing position and a separated position.

A hydraulic clutch according to an example embodiment of the present invention includes friction plates to transmit motive power, a piston movable between (i) a pressing position, at which the piston presses the friction plates for the hydraulic clutch to be engaged to transmit motive power, and (ii) a separated position, at which the piston is spaced apart from the friction plates for the hydraulic clutch to be disengaged to block motive power, the piston being movable into the pressing position in response to receiving hydraulic fluid to move the piston toward the pressing position, and a holder to (i) hold the piston at an intermediate position between the pressing position and the separated position in response to the piston coming into contact with the holder and (ii) release the piston from the intermediate position.

The above hydraulic clutch is configured such that (i) moving the piston into the pressing position, at which the piston presses the friction plates, causes the hydraulic clutch to be engaged to transmit motive power, where supplying the piston with hydraulic fluid to move the piston toward the pressing position moves the piston into the pressing position, and that (ii) moving the piston into the separated position, at which the piston is spaced apart from the friction plates, causes the hydraulic clutch to be disengaged to block motive power.

The hydraulic clutch of JP 2021-85430 A is configured to hold a piston at an intermediate position on the basis of the balance between the pressure of hydraulic fluid and the urging force of a spring. This is contrasted with the above hydraulic clutch in that the piston is pressed by the holder to be held sufficiently t the intermediate position between the pressing position and the separated position without being affected by such factors as variation in the pressure of hydraulic fluid.

The above configuration according to an example embodiment of the present invention allows the piston to be held stably at the intermediate position. This reduces or prevents friction torque (motive power loss) and allows the hydraulic clutch to become engaged responsively.

The hydraulic clutch may preferably be configured such that the intermediate position is closer the friction plates relative to a midpoint between the pressing position and the separated position.

With the above configuration, the intermediate position is closer to the pressing position, allowing the piston to be moved from the intermediate position into the pressing position in a short time period. This in turn allows the hydraulic clutch to become engaged more responsively.

The hydraulic clutch may preferably be configured such that the intermediate position is father from the friction plates relative to a midpoint between the pressing position and the separated position.

With the above configuration, the intermediate position is farther from the pressing position, preventing the piston at the intermediate position from being excessively close to the friction plates. This in turn allows the hydraulic clutch to become engaged more responsively and further reduces or prevents friction torque (motive power loss).

The hydraulic clutch may preferably be configured such that the holder is movable between (i) a holding position, at which the holder holds the piston at the intermediate position, and (ii) an allowing position, which is closer to the friction plates relative to the holding position and at which the holder allows the piston to be moved into the pressing position, the hydraulic clutch further includes a first urging structure urging the holder toward the holding position, and a second urging structure urging the piston toward the pressing position with an urging force smaller than an urging force of the first urging structure, and the holder holds the piston at the intermediate position in response to the piston being urged by the second urging structure toward the pressing position coming into contact with the holder being urged by the first urging structure into the holding position.

With the above configuration, the piston is urged by the second urging structure toward the pressing position while the piston is not supplied with hydraulic fluid to move the piston toward the pressing position. The holder is at the holding position due to the first urging structure. The piston comes into contact with the holder, and is held at the intermediate position.

With the above configuration, the second urging structure is operable to apply an urging force smaller than that of the first urging structure. This prevents the holder from being moved by the piston and the second urging structure from the holding position toward the allowing position, and allows the holder to be stably at the holding position.

The above configuration allows the holder to be stably at the holding position. This further reduces or prevents friction torque (motive power loss) and allows the hydraulic clutch to become engaged more responsively.

The hydraulic clutch may preferably be configured such that supplying the piston with hydraulic fluid to move the piston toward the pressing position moves the piston into the pressing position against the first urging structure, and the piston moves the holder into the allowing position.

With the above configuration, supplying hydraulic fluid to move the piston toward the pressing position moves the piston into the pressing position, and the piston moves the holder into the allowing position. The first urging structure resists the movement of the piston into the pressing position.

The hydraulic fluid has a pressure high enough to move the piston into the pressing position. Further, the urging force of the first urging structure is reduced by that of the second urging structure. This allows the piston to be moved from the intermediate position into the pressing position without delay.

The above configuration allows the piston to be moved from the intermediate position into the pressing position without delay. This in turn allows the hydraulic clutch to become engaged more responsively.

The hydraulic clutch may preferably be configured such that supplying the piston with hydraulic fluid to move the piston toward the separated position moves the piston into the separated position against the second urging structure.

With the above configuration, supplying hydraulic fluid to move the piston toward the separated position moves the piston into the separated position and disengages the hydraulic clutch.

The second urging structure resists the movement of the piston into the separated position. However, the hydraulic fluid has a sufficiently high pressure. Further, the second urging structure has a relatively small urging force. This allows the piston to be moved into the separated position without delay.

The above configuration allows the piston to be moved into the separated position without delay. This in turn allows the hydraulic clutch to become disengaged more responsively.

The hydraulic clutch may preferably further include a fluid chamber between the piston and the holder, wherein supplying hydraulic fluid into the fluid chamber moves the holder into the allowing position against the first urging structure and the piston into the separated position against the second urging structure.

With the above configuration, hydraulic fluid supplied into the fluid chamber between the piston and the holder acts on both the piston and the holder and easily moves the piston into the separated position.

A travel power transmission device according to an example embodiment of the present invention includes a plurality of power transmission systems to perform respective speed change steps with respective power transmission rates different from each other, and a plurality of power transmission clutches for the respective power transmission systems, the power transmission clutches each including friction plates to transmit motive power, and a piston movable between (i) a pressing position, at which the piston presses the friction plates for the hydraulic clutch to be engaged to transmit motive power, and (ii) a separated position, at which the piston is spaced apart from the friction plates for the hydraulic clutch to be disengaged to block motive power, the piston being movable into the pressing position in response to receiving hydraulic fluid to move the piston toward the pressing position, the travel power transmission device being operable to transmit motive power through a power transmission system among the plurality of power transmission systems of which power transmission system the power transmission clutch is engaged, at least one of the plurality of power transmission clutches being the hydraulic clutch according to one of the example embodiments described above.

A travel power transmission device may include a plurality of power transmission systems to perform respective speed change steps with respective power transmission rates different from each other, and each including a power transmission clutch with friction plates and a piston.

Such a travel power transmission device is operable to, in response to engagement of the power transmission clutch of one of the plurality of power transmission systems, transmit motive power through that power transmission system and, in response to engagement of the power transmission clutch of another power transmission system, transmit motive power through that other power transmission system. Engaging another power transmission clutch causes gears to be shifted.

A travel power transmission device according to an example embodiment of the present invention is the travel power transmission device according to an example embodiment of the present invention described above, and at least one of the power transmission clutches is a hydraulic clutch including friction plates and a piston as well as a holder.

For a switch from the state of transmitting motive power through a power transmission system to the state of transmitting motive power through another power transmission system including a hydraulic clutch, the above configuration allows the piston of the hydraulic clutch to be held in advance by the holder at the intermediate position.

Shifting gears involves disengaging the power transmission clutch of the power transmission system through which motive power is being transmitted. Moving the piston of the hydraulic clutch from the intermediate position into the pressing position engages the hydraulic clutch.

The above travel power transmission device reduces or prevents torque friction (motive power loss) and allows a responsive switch from the state of transmitting motive power through a power transmission system to the state of transmitting motive power through another power transmission system including a hydraulic clutch.

The travel power transmission device may preferably be configured such that the speed change steps include at least one speed change step within a low-speed region and at least one speed change step within a high-speed region, and the power transmission clutch of a power transmission system among the plurality of power transmission systems which power transmission system is configured for the at least one speed change step within the low-speed region is the hydraulic clutch.

While a travel power transmission device is transmitting motive power through a power transmission system configured for a high-speed step, the traveling speed is high, and the traveling inertia is large. Thus, even if shifting gears involves a long time period to move the piston of the power transmission clutch from the separated position into the pressing position, the traveling speed should change only a little during that time period, so that engaging the power transmission clutch should cause only a relatively small shock.

In contrast, while a travel power transmission device is transmitting motive power through a power transmission system configured for a low-speed step, the traveling speed is low, and the traveling inertia is small. Thus, if shifting gears involves a long time period to move the piston of the power transmission clutch from the separated position into the pressing position, the traveling speed should change greatly during that time period, so that engaging the power transmission clutch should cause a relatively large shock.

The above travel power transmission device is configured such that the power transmission clutch of the power transmission system configured for a speed change step within the low-speed region is a hydraulic clutch including friction plates and a piston as well as a holder.

The power transmission system configured for a speed change step within the low-speed region has a small traveling inertia and a large change in the traveling speed at the time of shifting gears. Such a power transmission system including as a power transmission clutch a hydraulic clutch including friction plates and a piston as well as a holder allows the travel power transmission device to further reduce or prevent friction torque (motive power loss) and shift gears more responsively.

The travel power transmission device may preferably be configured such that the pressing position and the separated position are separated from each other by a gap that is smaller for the power transmission clutch of a power transmission system among the plurality of power transmission systems which power transmission system is configured for the at least one speed change step within the high-speed region than for the hydraulic clutch of the power transmission system configured for the at least one speed change step within the low-speed region.

The above power transmission system is configured such that the pressing position and the separated position for the piston are separated from each other by a small gap for the power transmission clutch of the power transmission system configured for a speed change step within the high-speed region. This reduces or prevents delay in engagement of the power transmission clutch without use of a holder in the power transmission clutch.

A power transmission system configured for a speed change step within the high-speed region often transmits motive power with high-speed rotation and a small torque, and often includes a power transmission clutch with a small number of friction plates. Such a power transmission system including a power transmission clutch with a piston for which the pressing position and the separated position are separated from each other by a small gap is thus unlikely to increase friction torque (motive power loss).

A power transmission system configured for a speed change step within the high-speed region often transmits motive power with high-speed rotation and a small torque. Such a power transmission system including a power transmission clutch with a piston for which the pressing position and the separated position are separated from each other by a small gap allows the travel power transmission device to further reduce or prevent friction torque (motive power loss) and shift gears more responsively.

The travel power transmission device may preferably further include an operation section configured to cause the holder of the hydraulic clutch to hold the piston of the hydraulic clutch at the intermediate position in response to engagement of the power transmission clutch of a power transmission system among the plurality of 41 power transmission systems of which power transmission system the power transmission rate is next to the power transmission rate of a power transmission system among the plurality of power transmission systems which power transmission system includes the hydraulic clutch.

Suppose, for instance, that the power transmission clutch of the power transmission system configured for the second-gear step is a hydraulic clutch including friction plates and a piston as well as a holder.

The above travel power transmission device is configured such that, based on the above supposition, engaging the power transmission clutch of the power transmission system configured for the first-gear step, for instance, to transmit motive power through the power transmission system configured for the first-gear step allows the piston of the hydraulic clutch of the power transmission system configured for the second-gear step, which is next to the power transmission system configured for the first-gear step, to be held at the intermediate position.

A subsequent switch from the state of transmitting motive power through the power transmission system configured for the first-gear step to the state of transmitting motive power through the power transmission system configured for the second-gear step involves disengaging the power transmission clutch of the power transmission system configured for the first-gear step and moving the piston of the hydraulic clutch of the power transmission system configured for the second-gear step from the intermediate position into the pressing position to engage the hydraulic clutch.

The above travel power transmission device is configured such that a power transmission system with a small difference in the traveling speed includes the hydraulic clutch, which includes friction plates and a piston as well as a holder and which has a high responsiveness, to shift gears. This further reduces the shock caused by shifting gears.

The above configuration allows the travel power transmission device to further reduce or prevent friction torque (motive power loss) and shift gears more responsively with a further reduced shock.

The travel power transmission device may preferably be configured such that the operation section is configured to: (i) in response to engagement of the power transmission clutch of a power transmission system among the plurality of power transmission systems which power transmission system is configured for a lowest speed step among the speed change steps, cause the holder of the hydraulic clutch to hold the piston of the hydraulic clutch at the intermediate position, the hydraulic clutch being of a power transmission system among the plurality of power transmission systems which power transmission system is configured for a speed change step next to a lowest speed step on a high-speed side, and (ii) in response to engagement of the power transmission clutch of a power transmission system among the plurality of power transmission systems which power transmission system is configured for a speed change step on the high-speed side of the power transmission system configured for the lowest speed step, cause the holder of the hydraulic clutch to hold the piston of the hydraulic clutch at the intermediate position, the hydraulic clutch being of a power transmission system among the plurality of power transmission systems which power transmission system is configured for a speed change step next, on a low-speed side, to the speed change step of the power transmission system of which the power transmission clutch is engaged.

Suppose, for instance, that if the power transmission system configured for the lowest speed step among all the speed change steps is the power transmission system configured for the first-gear step, and the power transmission system configured for the speed change step on the high-speed side of the power transmission system configured for the lowest speed step is the power transmission system configured for the third-gear step, the power transmission clutch of the power transmission system configured for the second-gear step, which is next, on the low-speed side, to the power transmission system configured for the third-gear step, is a hydraulic clutch including friction plates and a piston as well as a holder.

The above travel power transmission device is configured such that, based on the above supposition, engaging the power transmission clutch of the power transmission system configured for the third-gear step, for instance, to transmit motive power through the power transmission system configured for the third-gear step allows the piston of the hydraulic clutch of the power transmission system configured for the second-gear step to be held at the intermediate position.

A subsequent switch from the state of transmitting motive power through the power transmission system configured for the third-gear step to the state of transmitting motive power through the power transmission system configured for the second-gear step involves disengaging the power transmission clutch of the power transmission system configured for the third-gear step and moving the piston of the hydraulic clutch of the power transmission system configured for the second-gear step from the intermediate position into the pressing position to engage the hydraulic clutch.

The travel power transmission device is configured such that a switch to the state of transmitting motive power through the power transmission system configured for a speed change step next on the low-speed side involves a hydraulic clutch including friction plates and a piston as well as a holder to shift gears. This reduces the shock caused by shifting gears.

Suppose, for instance, that if the power transmission system configured for the lowest speed step among all the speed change steps is the power transmission system configured for the first-gear step, the power transmission clutch of the power transmission system configured for the second-gear step, which is next on the high-speed side, is a hydraulic clutch including friction plates and a piston as well as a holder.

The above travel power transmission device is configured such that, based on the above supposition, engaging the power transmission clutch of the power transmission system configured for the first-gear step, for instance, to transmit motive power through the power transmission system configured for the first-gear step allows the piston of the hydraulic clutch of the power transmission system configured for the second-gear step to be held at the intermediate position.

A subsequent switch from the state of transmitting motive power through the power transmission system configured for the first-gear step to the state of transmitting motive power through the power transmission system configured for the second-gear step involves disengaging the power transmission clutch of the power transmission system configured for the first-gear step and moving the piston of the hydraulic clutch of the power transmission system configured for the second-gear step from the intermediate position into the pressing position to engage the hydraulic clutch.

The travel power transmission device is configured such that a switch from the state of transmitting motive power through the power transmission system configured for the lowest speed step to the state of transmitting motive power through the power transmission system configured for a speed change step next on the high-speed side involves a hydraulic clutch including friction plates and a piston as well as a holder to shift gears. This reduces the shock caused by shifting gears.

The above configuration allows the travel power transmission device to further reduce or prevent friction torque (motive power loss) and shift gears more responsively with a further reduced shock.

The travel power transmission device may preferably be configured such that the speed change steps include at least one speed change step within a low-speed region and at least one speed change step within a high-speed region, the power transmission clutch of a power transmission system among the plurality of power transmission systems which power transmission system is configured for the at least one speed change step within the low-speed region is the hydraulic clutch, and for a power transmission system among the plurality of power transmission systems which power transmission system is configured for a high-speed-region high-speed step on the high-speed side of a power transmission system among the plurality of power transmission systems which power transmission system is configured for a lowest speed change step among the at least one speed change step within the high-speed region, the operation section is operable to not hold the piston of the hydraulic clutch of the power transmission system configured for the high-speed-region high-speed step at the intermediate position in response to engagement of the power transmission clutch of the power transmission system configured for the high-speed-region high-speed step.

While a travel power transmission device is transmitting motive power through a power transmission system configured for a high-speed step, the traveling speed is high, and the traveling inertia is large. Thus, even if shifting gears involves a long time period to move the piston of the power transmission clutch from the separated position into the pressing position, the traveling speed should change only a little during that time period, so that engaging the power transmission clutch should cause only a relatively small shock.

In contrast, while a travel power transmission device is transmitting motive power through a power transmission system configured for a low-speed step, the traveling speed is low, and the traveling inertia is small. Thus, if shifting gears involves a long time period to move the piston of the power transmission clutch from the separated position into the pressing position, the traveling speed should change greatly during that time period, so that engaging the power transmission clutch should cause a relatively large shock.

The above travel power transmission device is configured such that the power transmission clutch of the power transmission system configured for a speed change step within the low-speed region is a hydraulic clutch including friction plates and a piston as well as a holder.

The power transmission system configured for a speed change step within the low-speed region has a small traveling inertia and a large change in the traveling speed at the time of shifting gears. Such a power transmission system including as a power transmission clutch a hydraulic clutch including friction plates and a piston as well as a holder allows the travel power transmission device to further reduce or prevent friction torque (motive power loss) and shift gears more responsively.

Suppose, for instance, that the power transmission system configured for a speed change step within the low-speed region corresponds to the power transmission system configured for the first-gear step and the power transmission system configured for the second-gear step, that the power transmission system configured for the first-gear step and the power transmission system configured for the second-gear step each include a hydraulic clutch including friction plates and a piston as well as a holder, and that the power transmission system configured for a speed change step within the high-speed region corresponds to the power transmission system configured for the third-gear step and the power transmission system configured for the fourth-gear step.

In this case, between the power transmission system configured for the third-gear step (which is within the high-speed region) and the power transmission system configured for the fourth-gear step (which is within the high-speed region), the power transmission system configured for the fourth-gear step corresponds to the power transmission system configured for the high-speed-region high-speed step on the high-speed side of the power transmission system configured for the third-gear step (that is, the lowest speed step within the high-speed region).

The above travel power transmission device is configured such that, based on the above supposition, engaging the power transmission clutch of the power transmission system configured for the fourth-gear step (that is, the high-speed-region high-speed step), for instance, does not cause the respective pistons of the hydraulic clutch of the power transmission system configured for the first-gear step (which is within the low-speed region) and the hydraulic clutch of the power transmission system configured for the second-gear step (which is within the low-speed region) to be held at the intermediate position.

Stated differently, since the state of transmitting motive power through the power transmission system configured for the fourth-gear step (that is, the high-speed-region high-speed step) is switched to the state of transmitting motive power through the power transmission system configured for the third-gear step (which is within the high-speed region) next on the low-speed side or the state of transmitting motive power through the power transmission system configured for the fifth-gear step (which is within the high-speed region) next on the high-speed side, the respective pistons of the hydraulic clutch of the power transmission system configured for the first-gear step (which is within the low-speed region) and the hydraulic clutch of the power transmission system configured for the second-gear step (which is within the low-speed region) need not be held at the intermediate position.

With the above configuration, holding the piston of the hydraulic clutch of the power transmission system configured for a speed change step within the low-speed region at the intermediate position prevents an increase in friction torque (motive power loss). This allows the travel power transmission device to further reduce or prevent friction torque (motive power loss) and shift gears more responsively.

The travel power transmission device may preferably be configured such that the hydraulic clutch of the power transmission system configured for the at least one speed change step within the low-speed region is the above hydraulic clutch, and the operation section includes a branch fluid passage branching from a supply fluid passage to supply hydraulic fluid to move, toward the pressing position, the piston of the power transmission clutch of the power transmission system configured for the high-speed-region high-speed step, the branch fluid passage being connected to the fluid chamber to supply a portion of the hydraulic fluid from the supply fluid passage into the fluid chamber.

The above travel power transmission device is configured such that, based on the above supposition, supplying hydraulic fluid to the power transmission clutch of the power transmission system configured for the fourth-gear step (that is, the high-speed-region high-speed step) to engage the power transmission clutch, for instance, causes a portion of the hydraulic fluid to be supplied through the branch fluid passage into the respective fluid chambers of the hydraulic clutch of the power transmission system configured for the first-gear step (which is within the low-speed region) and the hydraulic clutch of the power transmission system configured for the second-gear step (which is within the low-speed region). This moves the respective pistons of the hydraulic clutches into the separated position and the respective holders thereof into the allowing position, and does not move the respective pistons thereof into the intermediate position.

Including a branch fluid passage branching from a supply fluid passage to supply hydraulic fluid to the power transmission clutch of the power transmission system configured for the high-speed-region high-speed step allows the piston of the hydraulic clutch of the power transmission system configured for a speed change step within the low-speed region to not be held at the intermediate position, with the result of a simplified structure.

A work vehicle according to an example embodiment of the present invention includes a motive power source, a travel device, and a power transmission system to transmit motive power from the motive power source to the travel device, the power transmission system including the hydraulic clutch according to one of the example embodiments of the present invention described above.

The above work vehicle allows the holder of the hydraulic clutch to hold the piston of the hydraulic clutch at the intermediate position before a switch from the state of motive power for the travel device being blocked to the state of motive power being transmitted to the travel device. For a switch to the state of motive power being transmitted to the travel device, moving the piston of the hydraulic clutch from the intermediate position into the pressing position engages the hydraulic clutch.

The above configuration allows a switch from the state of motive power for the travel device being blocked to the state of motive power being transmitted to the travel device while inhibiting friction torque (motive power loss) with a high responsiveness. This allows the work vehicle to have good power transmission performance.

A work vehicle according to an example embodiment of the present invention includes a motive power source, a travel device, and the travel power transmission device according to one of the example embodiments of the present invention described above, the travel power transmission device being operable to transmit motive power from the motive power source to the travel device.

A travel power transmission device for a work vehicle may include a plurality of power transmission systems configured for respective speed change steps with respective power transmission rates different from each other, and each including a power transmission clutch including friction plates and a piston.

Such a travel power transmission device is operable to, in response to engagement of the power transmission clutch of one of the plurality of power transmission systems, transmit motive power through that power transmission system and, in response to engagement of the power transmission clutch of another power transmission system, transmit motive power through that other power transmission system. Engaging another power transmission clutch causes gears to be shifted.

A travel power transmission device according to an example embodiment of the present invention is configured as the travel power transmission device according to one of the example embodiments of the present invention described above, and is further configured such that at least one of the power transmission clutches is a hydraulic clutch including friction plates and a piston as well as a holder.

For a switch from the state of transmitting motive power through a power transmission system to the state of transmitting motive power through another power transmission system including a hydraulic clutch, the above configuration allows the piston of the hydraulic clutch to be held in advance by the holder at the intermediate position.

Shifting gears involves disengaging the power transmission clutch of the power transmission system through which motive power is being transmitted. Moving the piston of the hydraulic clutch from the intermediate position into the pressing position engages the hydraulic clutch.

The above work vehicle reduces or prevents friction torque (motive power loss) and allows a responsive switch from the state of transmitting motive power through a power transmission system to the state of transmitting motive power through a power transmission system including a hydraulic clutch.

The above and other elements, features, steps, characteristics and advantages of the present invention will become more apparent from the following detailed description of the example embodiments with reference to the attached drawings.

BRIEF DESCRIPTION OF THE DRAWINGS

FIG. 8 is a table that shows how different positions of a shift pedal (that is, a first-gear to fourth-gear ranges) are related to the respective positions of the piston and the holder (or the position of the piston) of first to fourth clutches.

DETAILED DESCRIPTION OF THE EXAMPLE EMBODIMENTS

Figure 1:
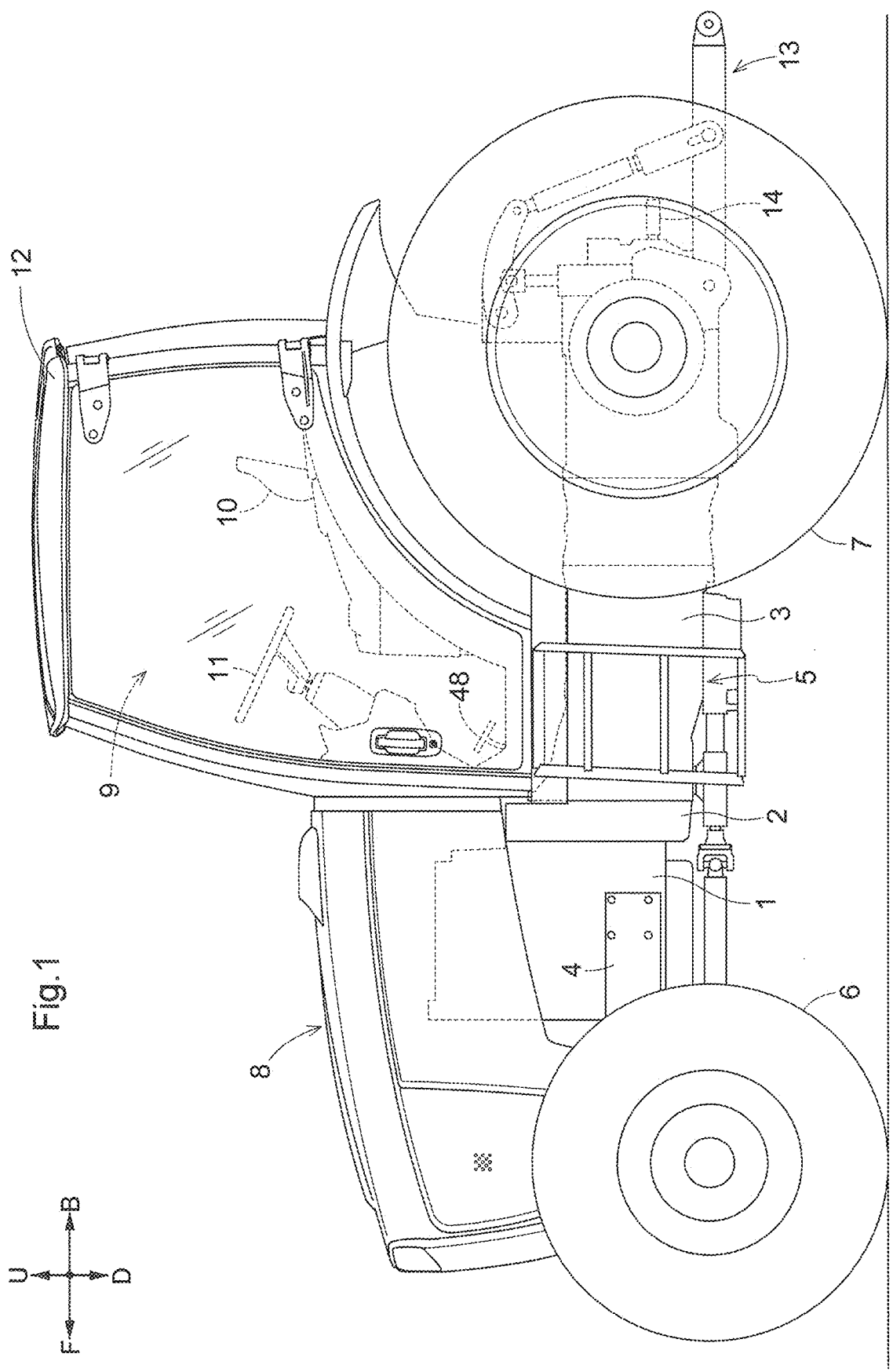
FIG. 1 is a left side view of a tractor.

FIGS. 1 to 8 are each related to tractors as example work vehicles each including a hydraulic clutch and a travel power transmission device in accordance with example embodiments of the present invention. FIG. 1 shows "F" to indicate the forward direction, "B" to indicate the backward direction, "U" to indicate the upward direction, and "D" to indicate the downward direction.

As illustrated in FIG. 1, the tractor includes a body 5, a pair of left and right front wheels 6 (which is an example of the "at least one travel device") provided for the body 5, and a pair of left and right rear wheels 7 (which is an example of the "at least one travel device") provided for the body 5. The body 5 is supported by the front and rear wheels 6 and 7. The body 5 is provided with components such as an engine 1 (which is an example of the "motive power source"), a flywheel housing 2 coupled to a back portion of the engine 1, a transmission case 3 coupled to a back portion of the flywheel housing 2, and a front frame 4 coupled to a front portion of the engine 1.

The front wheels 6 are disposed on the front frame 4, whereas the rear wheels 7 are disposed on a back portion of the transmission case 3. The tractor includes a hood 8 configured to cover the engine 1 and a driver section 9 disposed on the body 5 and including a driver's seat 10 and a steering wheel 11 to turn the front wheels 6. The tractor also includes a cabin 12 enclosing the driver section 9.

The tractor includes a link mechanism 13 and a power take-off (PTO) shaft 14. The link mechanism 13 is disposed at a back portion of the body 5 and linkable with any of various work devices (not illustrated in the drawings). The PTO shaft 14 is disposed at a back portion of the transmission case 3 and configured to transmit motive power to the work device.

Figure 2:
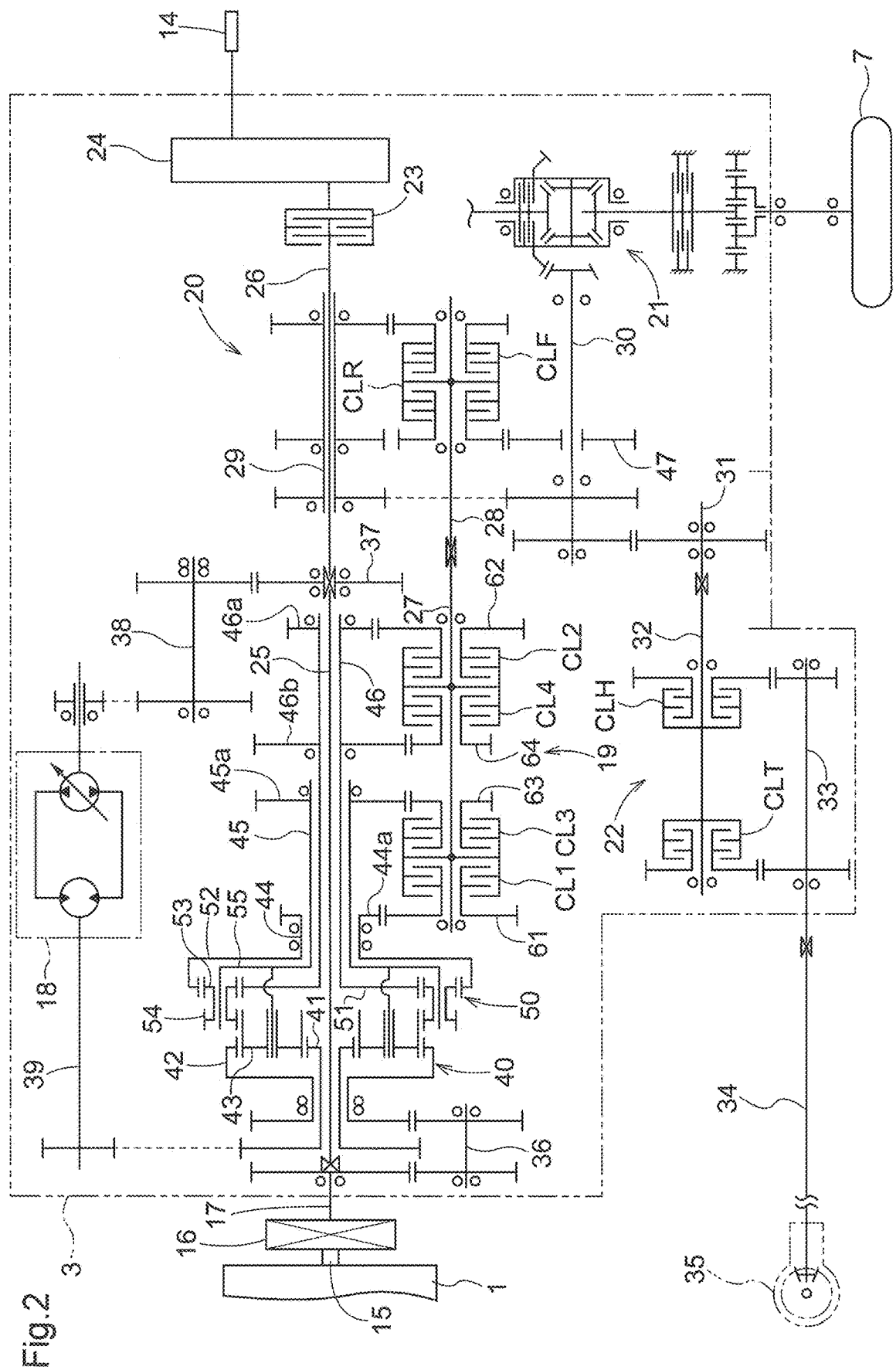
FIG. 2 is a diagram schematically illustrating the inside of a transmission case.

As illustrated in FIG. 2, the transmission case 3 includes components such as a first planetary device 40, a second planetary device 50, a continuously variable transmission device 18, a power transmission device 19 (which is an example of the "travel power transmission device"), a forward/rearward travel switching device 20, a rear-wheel differential device 21, a front-wheel transmission device 22, a PTO clutch 23, and a PTO transmission device 24.

The engine 1 transmits motive power from its output shaft 15 through a damper disc 16 to the input shaft 17 of the transmission case 3. The motive power is then transmitted from the input shaft 17 to a power transmission shaft 25 and a power transmission shaft 26. The power transmission shaft 26 transmits the motive power to the PTO clutch 23. The motive power is varied by the PTO transmission device 24 and transmitted to the PTO shaft 14.

The engine 1 transmits motive power from its output shaft 15 through the damper disc 16 to the first planetary device 40, the second planetary device 50, the continuously variable transmission device 18, and the power transmission device 19. The motive power is varied and transmitted to an output shaft 27.

The motive power of the output shaft 27 is transmitted from a power transmission shaft 28 to the forward/rearward travel switching device 20. The motive power of the forward/rearward travel switching device 20 is transmitted from a cylindrical power transmission shaft 29, which is rotatably attached to the power transmission shaft 26, to a power transmission shaft 30, to the rear-wheel differential device 21, and to the rear wheels 7.

The motive power from the power transmission shaft 30 is transmitted to a power transmission shaft 31 and through a power transmission shaft 32 to the front-wheel transmission device 22. The motive power of the front-wheel transmission device 22 is transmitted from a front-wheel output shaft 33 through a power transmission shaft 34 to a front-wheel differential device 35 and to the front wheels 6.

As illustrated in FIG. 2, the first planetary device 40 includes a sun gear 41, a ring gear 42, and two or more planetary gears 43, whereas the second planetary device 50 includes a sun gear 51, a ring gear 52, and two or more planetary gears 53 and 54.

The first and second planetary devices 40 and 50 share a carrier 55. The first planetary device 40 is configured such that the planetary gears 43 mesh with the sun gear 41 and the ring gear 42 and are rotatably attached to the carrier 55.

The second planetary device 50 is configured such that the planetary gears 53 and 54 are coupled to each other in such a manner as to be capable of rotating integrally with each other and are rotatably attached to the carrier 55. The planetary gear 54 meshes with the planetary gears 43, whereas the planetary gear 53 meshes with the sun gear 51 and the ring gear 52.

The motive power from the input shaft 17 is transmitted through a power transmission shaft 36 to the ring gear 42 of the first planetary device 40. The motive power of the input shaft 17 is transmitted from a power transmission gear 37, which couples the power transmission shafts 25 and 26 to each other, through a power transmission shaft 38 to the continuously variable transmission device 18. The continuously variable transmission device 18 is of a hydraulic type, and outputs normal-direction motive power and reverse-direction motive power to be transmitted from an output shaft 39 to the sun gear 41 of the first planetary device 40.

The first and second planetary devices 40 and 50 composite (i) the motive power transmitted from the engine 1 through the continuously variable transmission device 18 to the sun gear 41 of the first planetary device 40 and (ii) the motive power transmitted from the engine 1 not through the continuously variable transmission device 18 to the ring gear 42 of the first planetary device 40.

The motive power composited by the first and second planetary devices 40 and 50 is transmitted from the ring gear 52 of the second planetary device 50 to a cylindrical output shaft 44, from the carrier 55 to a cylindrical output shaft 45, and from the sun gear 51 of the second planetary device 50 to a cylindrical output shaft 46.

Figure 3:
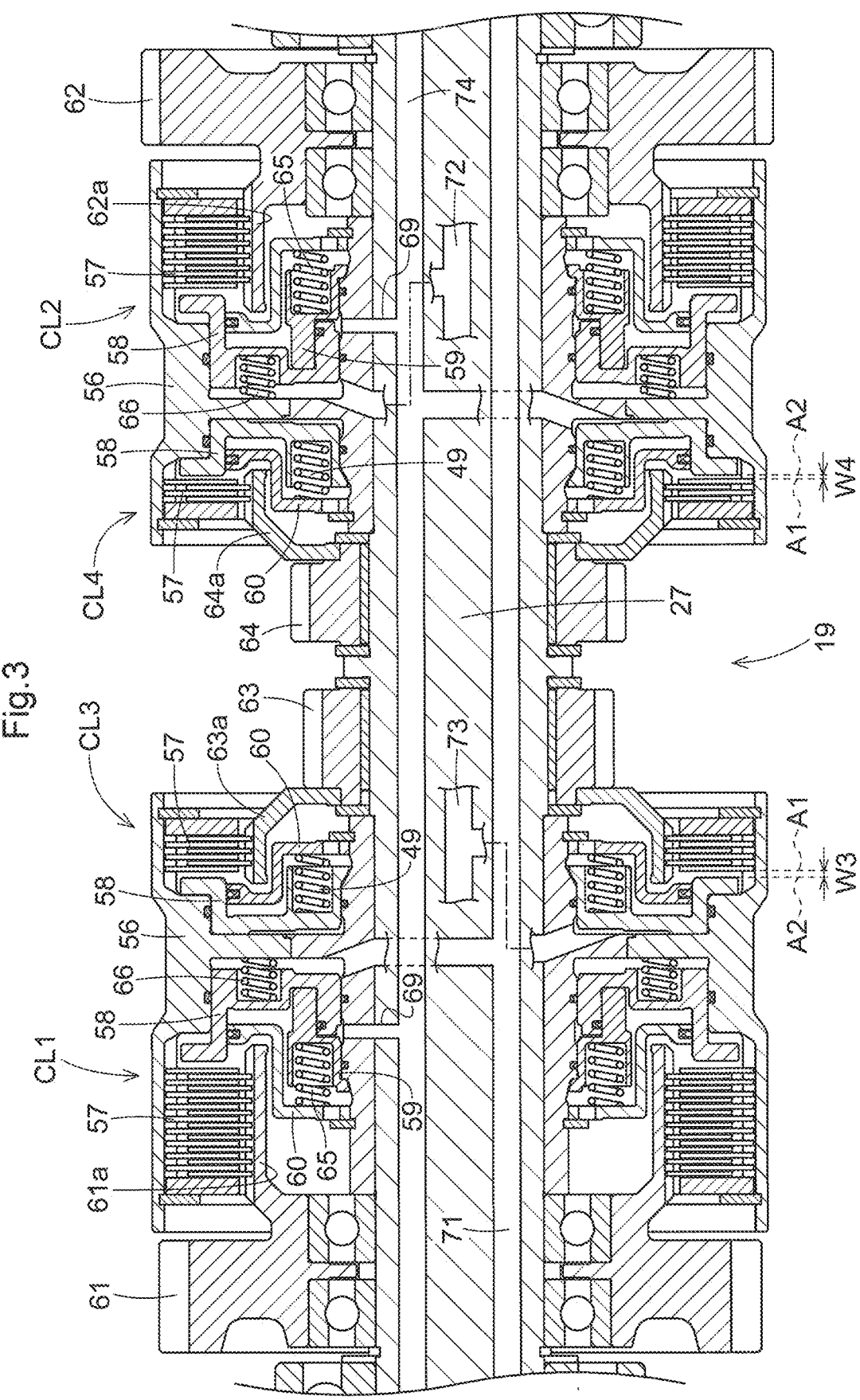
FIG. 3 is a cross-sectional view of a power transmission device.

As illustrated in FIGS. 2 and 3, the power transmission device 19 includes first to fourth clutches CL1 to CL4, input gears 61 to 64, and an output shaft 27.

The output shaft 44 includes an output gear 44a meshing with an input gear 61 of the first clutch CL1. The output shaft 46 includes an output gear 46a meshing with an input gear 62 of the second clutch CL2 and an output gear 46b meshing with an input gear 64 of the fourth clutch CL4. The output shaft 45 includes an output gear 45a meshing with an input gear 63 of the third clutch CL3.

In response to the first clutch CL1 becoming engaged, the motive power composited by the first and second planetary devices 40 and 50 is transmitted from the ring gear 52 of the second planetary device 50 through the output gear 44a of the output shaft 44, the input gear 61, and the first clutch CL1 to the output shaft 27.

In response to the second clutch CL2 becoming engaged, the motive power composited by the first and second planetary devices 40 and 50 is transmitted from the sun gear 51 of the second planetary device 50 through the output gear 46a of the output shaft 46, the input gear 62, and the second clutch CL2 to the output shaft 27.

In response to the third clutch CL3 becoming engaged, the motive power composited by the first and second planetary devices 40 and 50 is transmitted from the carrier 55 through the output gear 45a of the output shaft 45, the input gear 63, and the third clutch CL3 to the output shaft 27.

In response to the fourth clutch CL4 becoming engaged, the motive power composited by the first and second planetary devices 40 and 50 is transmitted from the sun gear 51 of the second planetary device 50 through the output gear 46b of the output shaft 46, the input gear 64, and the fourth clutch CL4 to the output shaft 27.

As illustrated in FIGS. 2 and 3, the power transmission device 19 is configured such that the input gear 61 is a power transmission system configured for a first-gear step (corresponding to the "lowest speed step among the speed change steps"), whereas the first clutch CL1 is a power transmission clutch or hydraulic clutch of the power transmission system configured for the first-gear step.

The input gear 62 is a power transmission system configured for a second-gear step which power transmission system is next to the power transmission system configured for the first-gear step on the high-speed side, whereas the second clutch CL2 is a power transmission clutch or hydraulic clutch of the power transmission system configured for the second-gear step.

The input gear 63 is a power transmission system configured for a third-gear step which power transmission system is next to the power transmission system configured for the second-gear step on the high-speed side, whereas the third clutch CL3 is a power transmission clutch of the power transmission system configured for the third-gear step.

The input gear 64 is a power transmission system configured for a fourth-gear step which power transmission system is next to the power transmission system configured for the third-gear step on the high-speed side, whereas the fourth clutch CL4 is a power transmission clutch of the power transmission system configured for the fourth-gear step.

The above travel power transmission device 19 includes a plurality of power transmission systems (that is, the input gears 61 to 64) configured for respective speed change steps and having respective power transmission rates different from each other, and a plurality of power transmission clutches (that is, the first to fourth clutches CL1 to CL4) for the respective power transmission systems (that is, the input gears 61 to 64), the travel power transmission device 19 being configured to transmit motive power through a power transmission system among the plurality of power transmission systems (that is, the input gears 61 to 64) of which power transmission system the power transmission clutch (that is, the first to fourth clutches CL1 to CL4) is engaged.

The above travel power transmission device 19 is further configured such that at least one of the plurality of power transmission clutches (that is, the first to fourth clutches CL1 to CL4) being a hydraulic clutch (that is, the first and second clutches CL1 and CL2).

The above travel power transmission device 19 may be configured such that the speed change steps (that is, the first-gear to fourth-gear steps) include at least one speed change step (that is, the first-gear and second-gear steps) within a low-speed region and at least one speed change step (that is, the third-gear and fourth-gear steps) within a high-speed region, the power transmission clutch (that is, the first and second clutches CL1 and CL2) of a power transmission system among the plurality of power transmission systems which power transmission system (that is, the input gears 61 and 62) is configured for the at least one speed change step (that is, the first-gear and second-gear steps) within the low-speed region is the hydraulic clutch (that is, the first and second clutches CL1 and CL2).

As illustrated in FIG. 2, the forward/rearward travel switching device 20 includes a forward-travel clutch CLF, a rearward-travel clutch CLR, power transmission shafts 28 and 29, and a relay gear 47. The motive power of the output shaft 27 is transmitted to the power transmission shaft 28.

The forward/rearward travel switching device 20 is configured such that in response to the forward-travel clutch CLF becoming engaged, the motive power from the power transmission shaft 28 is transmitted through the forward-travel clutch CLF to the power transmission shaft 29 in a forward-travel state and from the power transmission shaft 29 through the power transmission shaft 30 to the rear-wheel differential device 21.

The forward/rearward travel switching device 20 is configured such that in response to the rearward-travel clutch CLR becoming engaged, the motive power from the power transmission shaft 28 is transmitted through the rearward-travel clutch CLR and the relay gear 47 to the power transmission shaft 29 in a rearward-travel state and from the power transmission shaft 29 through the power transmission shaft 30 to the rear-wheel differential device 21.

As illustrated in FIG. 2, the front-wheel transmission device 22 includes a standard clutch CLT, a speed-increasing clutch CLH, a power transmission shaft 32, and a front-wheel output shaft 33.

Turning each front wheel 6 from its straight-travel position to the left or right at an angle within a predetermined range engages the standard clutch CLT. In this state, the motive power from the power transmission shaft 30 is transmitted through the power transmission shafts 31 and 32 and the standard clutch CLT to the front-wheel output shaft 33 and through the power transmission shaft 34 and the front-wheel differential device 35 to the front wheels 6. This drives the front and rear wheels 6 and 7 at the same speed.

Turning each front wheel 6 to the left or right beyond the left or right predetermined range engages the speed-increasing clutch CLH. In this state, the motive power of the power transmission shaft 30 is transmitted through the power transmission shafts 31 and 32 and the speed-increasing clutch CLH to the front-wheel output shaft 33 and through the power transmission shaft 34 and the front-wheel differential device 35 to the front wheels 6. This drives the front wheels 6 at a speed higher than the speed at which the rear wheels 7 are driven.

As illustrated in FIG. 3, the power transmission device 19 is configured such that the third and fourth clutches CL3 and CL4 are of a hydraulic multi-disc type and each include a casing 56, friction plates 57, a piston 58, a spring receiver 60, and a spring 49.

The casing 56 is coupled to the output shaft 27 in such a manner as to be rotatable integrally with the output shaft 27. The input gears 63 and 64 include respective cylindrical holders 63a and 64a each partially inside the corresponding casing 56. The friction plates 57 are in the corresponding casing 56, and are made up of an alternating arrangement of those rotatable integrally with the casing 56 and those rotatable integrally with the corresponding one of the input gears 63 and 64 (specifically, of the holders 63a and 64a).

The piston 58 is in the shape of a ring in the corresponding casing 56, and is movable between a pressing position A1, in which the piston 58 presses the corresponding friction plates 57, and a separated position A2, in which the piston 58 is spaced apart from the friction plates 57.

The spring receiver 60 is in the shape of a disc fixed inside the corresponding casing 56. The spring 49 extends from the corresponding piston 58 to the corresponding spring receiver 60, and urges the piston 58 toward the separated position A2.

As illustrated in FIG. 3, the power transmission device 19 is configured such that the first and second clutches CL1 and CL2 are of a hydraulic multi-disc type and each include a casing 56, friction plates 57, a piston 58, a holder 59, a spring receiver 60, a spring 65 (which is an example of the "first urging structure"), and a spring 66 (which is an example of the "second urging structure"). The first clutch CL1 shares a casing 56 with the third clutch CL3, whereas the second clutch CL2 shares a casing 56 with the fourth clutch CL4.

The input gears 61 and 62 include respective cylindrical holders 61a and 62a each partially inside the corresponding casing 56. The friction plates 57 are in the corresponding casing 56, and include an alternating arrangement of those rotatable integrally with the casing 56 and those rotatable integrally with the corresponding one of the input gears 61 and 62 (specifically, of the holders 61a and 62a).

Figure 5:
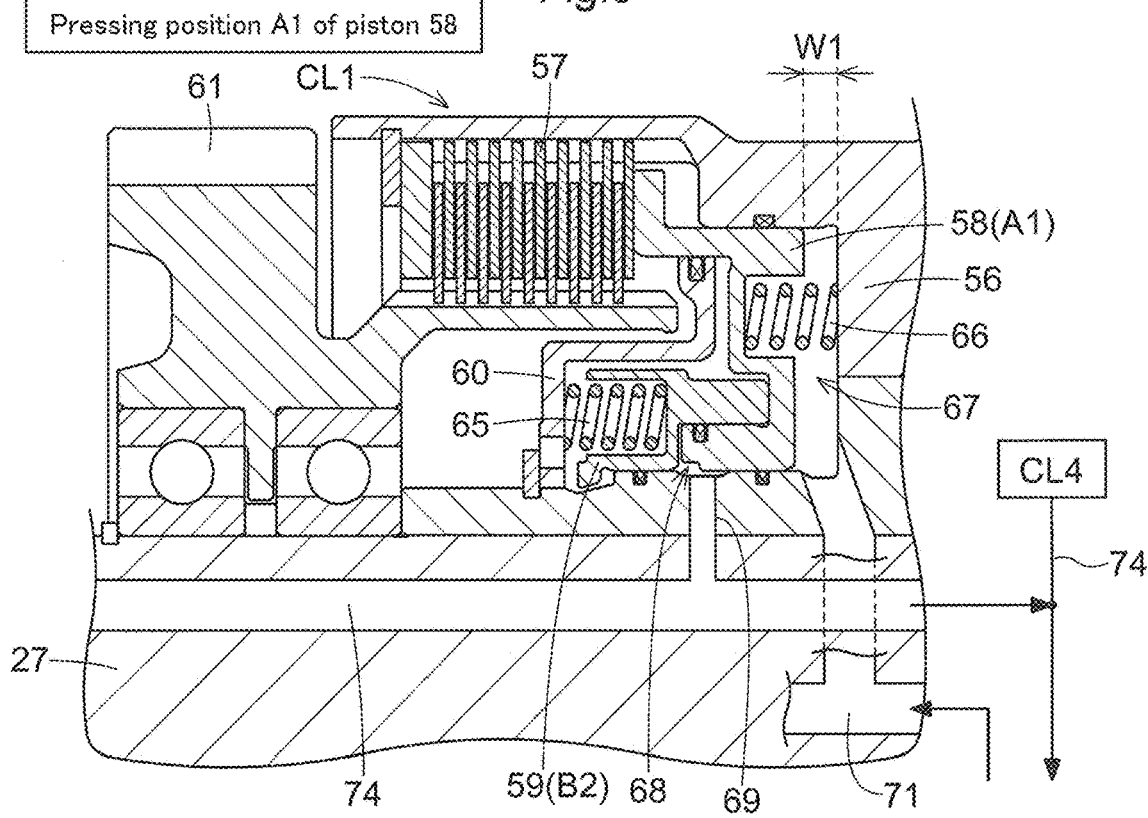
FIG. 5 is a cross-sectional view of a first clutch with a piston at a pressing position.
Figure 6:
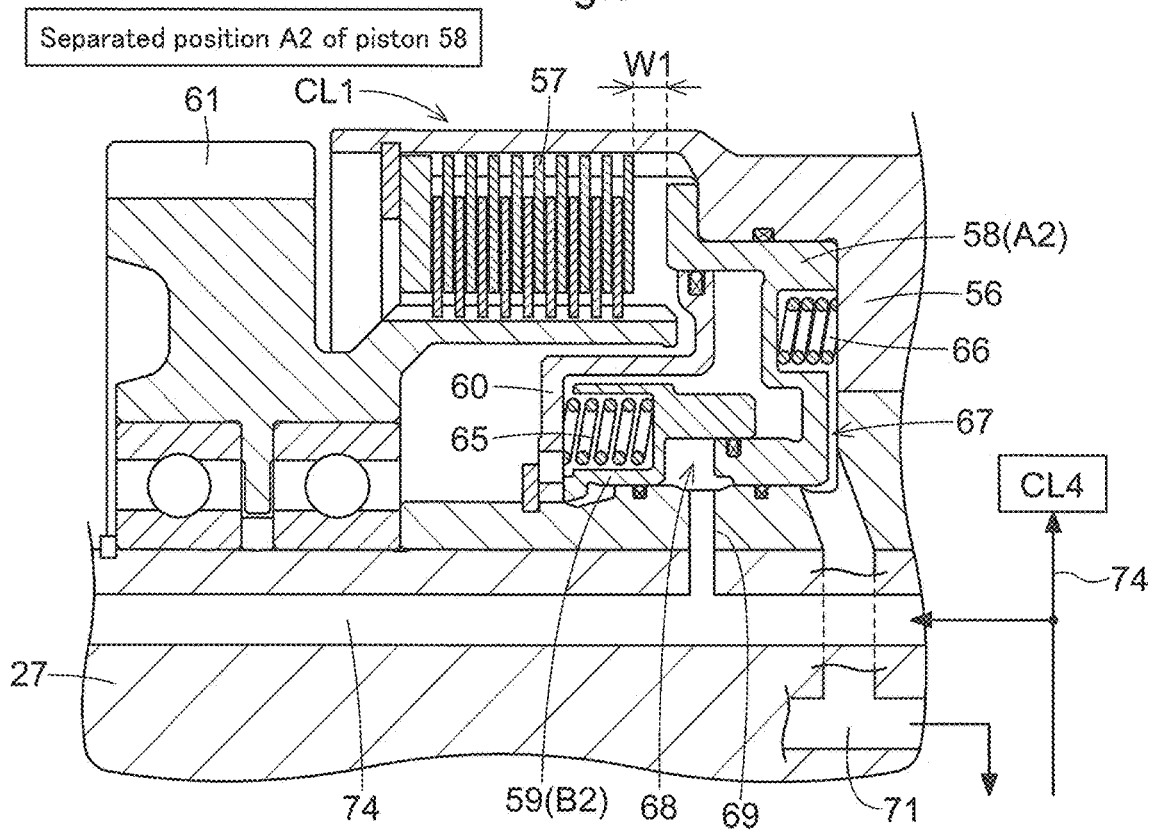
FIG. 6 is a cross-sectional view of a first clutch with a piston at a separated position.

The piston 58 is in the shape of a ring in the corresponding casing 56, and is movable between a pressing position A1 (see FIG. 5), in which the piston 58 presses the corresponding friction plates 57, and a separated position A2, in which the piston 58 is spaced apart from the friction plates 57 (see FIG. 6).

As illustrated in FIGS. 5 and 6, the first and second clutches CL1 and CL2 each include a fluid chamber 67 defined between the corresponding casing 56 and a back surface of the corresponding piston 58. The spring 66 is in the corresponding fluid chamber 67, and urges the corresponding piston 58 toward the pressing position A1.

As illustrated in FIGS. 3 to 6, the first and second clutches CL1 and CL2 are each configured such that the holder 59 is in the shape of a ring in the corresponding casing 56, and is movable between a holding position B1 (see FIG. 4) and an allowing position B2, which is closer to the corresponding friction plates 57 relative to the holding position B1 (see FIGS. 5 and 6).

The spring receiver 60 is in the shape of a disc fixed inside the corresponding casing 56. The spring 65 extends from the corresponding holder 59 to the corresponding spring receiver 60, and urges the holder 59 toward the holding position B1. The spring 66 applies an urging force smaller than that of the corresponding spring 65. The first and second clutches CL1 and CL2 each include a fluid chamber 68 defined between the corresponding piston 58 and the corresponding holder 59, and are configured to supply hydraulic fluid into and discharge hydraulic fluid from each of the fluid chambers 67 and 68 (described later).

As illustrated in FIG. 3, the first to fourth clutches CL1 to CL4, which are for respective power transmission systems of first to fourth speed steps, are configured such that the first clutch CL1 includes friction plates 57 in a number larger than that of friction plates 57 of the second clutch CL2.

The third clutch CL3 includes friction plates 57 in a number smaller than that of friction plates 57 of the second clutch CL2. The fourth clutch CL4 includes friction plates 57 in a number smaller than that of friction plates 57 of the third clutch CL3.

As illustrated in FIGS. 5 and 6, the piston 58 of the first clutch CL1 has a pressing position A1 and a separated position A2 apart from each other by a distance W1 substantially equal to the distance W1 between the pressing position A1 and the separated position A2 for the piston 58 of the second clutch CL2.

As illustrated in FIG. 3, the piston 58 of the third clutch CL3 has a pressing position A1 and a separated position A2 apart from each other by a distance W3 smaller than the distance W1 between the pressing position A1 and the separated position A2 for the piston 58 of the first clutch CL1 (or the second clutch CL2) (see FIGS. 5 and 6). The piston 58 of the fourth clutch CL4 has a pressing position A1 and a separated position A2 apart from each other by a distance W4 smaller than the distance W3 between the pressing position A1 and the separated position A2 for the piston 58 of the third clutch CL3.

The above travel power transmission device 19 may be configured such that the pressing position A1 and the separated position A2 are separated from each other by a gap W1, W3, W4 that is smaller for the power transmission clutch (that is, the third and fourth clutches CL3 and CL4) of a power transmission system among the plurality of power transmission systems which power transmission system (that is, the input gears 63 and 64) is configured for the at least one speed change step (that is, the third-gear and fourth-gear steps) within the high-speed region than for the hydraulic clutch (that is, the first and second clutches CL1 and CL2) of the power transmission system (that is, the input gears 61 and 62) configured for the at least one speed change step (that is, the first-gear and second-gear steps) within the low-speed region.

As illustrated in FIGS. 3 to 6, the output shaft 27 includes supply fluid passages 71 to 74 inside each configured to receive hydraulic fluid from a pump (not illustrated in the drawings) through a control valve (not illustrated in the drawings) and discharge hydraulic fluid through the control valve.

The supply fluid passage 71 is connected to the fluid chamber 67 of the first clutch CL1. The supply fluid passage 72 is connected to the fluid chamber 67 of the second clutch CL2. The supply fluid passage 73 is connected to the fluid chamber between the casing 56 of the third clutch CL3 and a back surface of the corresponding piston 58.

The supply fluid passage 74 is connected to the fluid chamber between the casing 56 of the fourth clutch CL4 and a back surface of the corresponding piston 58. The supply fluid passage 74 has branch fluid passages 69 (which is an example of the "operation section") branching therefrom and connected to the respective fluid chambers 68 of the first and second clutches CL1 and CL2.

As illustrated in FIG. 3, supplying hydraulic fluid through the supply fluid passage 73 into the fluid chamber of the third clutch CL3 moves the corresponding piston 58 into the pressing position A1 and thereby engages the third clutch CL3. Discharging hydraulic fluid from the fluid chamber of the third clutch CL3 through the supply fluid passage 73 moves the corresponding piston 58 into the separated position A2 and thereby disengages the third clutch CL3.

Supplying hydraulic fluid through the supply fluid passage 74 into the fluid chamber of the fourth clutch CL4 moves the corresponding piston 58 into the pressing position A1 and thereby engages the fourth clutch CL4. Discharging hydraulic fluid from the fluid chamber of the fourth clutch CL4 through the supply fluid passage 74 moves the corresponding piston 58 into the separated position A2 and thereby disengages the fourth clutch CL4.

As illustrated in FIG. 6, supplying hydraulic fluid through the supply fluid passage 74 into the fluid chamber of the fourth clutch CL4 to engage the fourth clutch CL4 supplies hydraulic fluid from the supply fluid passage 74 through the branch fluid passages 69 into the respective fluid chambers 68 of the first and second clutches CL1 and CL2.

Figure 4:
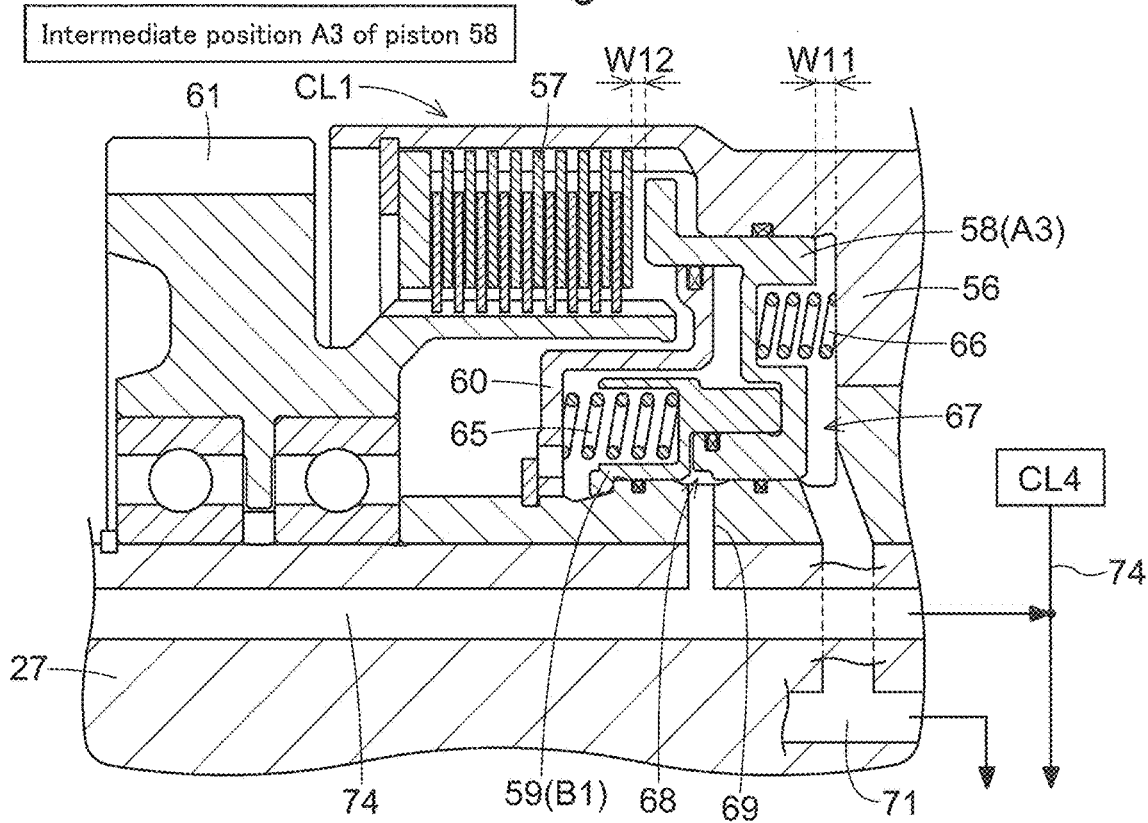
FIG. 4 is a cross-sectional view of a first clutch with a piston at an intermediate position.

As illustrated in FIGS. 4 and 5, discharging hydraulic fluid from the fluid chamber of the fourth clutch CL4 through the supply fluid passage 74 to disengage the fourth clutch CL4 discharges hydraulic fluid from the respective fluid chambers 68 of the first and second clutches CL1 and CL2 through the respective branch fluid passages 69 and the supply fluid passage 74.

As illustrated in FIG. 5, supplying hydraulic fluid through the supply fluid passage 71 into the fluid chamber 67 of the first clutch CL1 disengages the second to fourth clutches CL2 to CL4. This discharges hydraulic fluid from the fluid chamber 68 of the first clutch CL1 through the corresponding branch fluid passage 69 and the supply fluid passage 74.

Supplying hydraulic fluid into the fluid chamber 67 and discharging hydraulic fluid from the fluid chamber 68 causes the piston 58 to be moved into the pressing position A1 to press the friction plates 57 while pressing the holder 59 toward the allowing position B2 against the spring 65, as the hydraulic fluid supplied into the fluid chamber 67 has a pressure sufficiently stronger than the urging force of the spring 65. This engages the first clutch CL1.

As illustrated in FIG. 4, discharging hydraulic fluid from the fluid chamber 67 of the first clutch CL1 through the supply fluid passage 71 disengages the fourth clutch CL4. This discharges hydraulic fluid from the fluid chamber 68 of the first clutch CL1 through the corresponding branch fluid passage 69 and the supply fluid passage 74.

Discharging hydraulic fluid from the fluid chambers 67 and 68 causes the holder 59 to be moved into the holding position B1 and held therein by the spring 65. While the spring 66 moves the piston 58 toward the pressing position A1, the piston 58 comes into contact with the holder 59 in the holding position B1, and is stopped by the holder 59.

Since the spring 66 applies an urging force smaller than that of the spring 65 as mentioned above, the piston 58 (in other words, the spring 66) is incapable of pressing the holder 59 against the spring 65. The piston 58 is thus held in an intermediate position A3 between the pressing position A1 and the separated position A2 illustrated in FIG. 4.

The intermediate position A3 (and the holding position B1) is such that with the piston 58 in the intermediate position A3, the casing 56 is separated from the back surface of the piston 58 by a gap W11 larger than the gap W12 by which the friction plates 57 are separated from the piston 58.

The piston 58 in the intermediate position A3 is thus toward the friction plates 57 relative to the midpoint between the pressing position A1 and the separated position A2. The piston 58, in this state, does not press the friction plates 57, with the result of the first clutch CL1 being disengaged.

The second clutch CL2 has an intermediate position A3 (and a holding position B1) similar to that for the first clutch CL1.

As illustrated in FIG. 6, discharging hydraulic fluid from the fluid chamber 67 of the first clutch CL1 through the supply fluid passage 71 engages the fourth clutch CL4. This supplies hydraulic fluid from the supply fluid passage 74 through the corresponding branch fluid passage 69 into the fluid chamber 68 of the first clutch CL1.

Discharging hydraulic fluid from the fluid chamber 67 and supplying hydraulic fluid into the fluid chamber 68 moves the piston 58 against the spring 66 into the separated position A2 and moves the holder 59 against the spring 65 into the allowing position B2, as the hydraulic fluid supplied into the fluid chamber 68 has a pressure sufficiently stronger than the respective urging forces of the springs 65 and 66. This disengages the first clutch CL1.

The second clutch CL2 is operable as below in a manner similar to the above manner of operating the first clutch CL1.

Supplying hydraulic fluid through the supply fluid passage 72 into the fluid chamber 67 of the second clutch CL2 disengages the first, third, and fourth clutches CL1, CL3, and CL4. This discharges hydraulic fluid from the fluid chamber 68 of the second clutch CL2 through the corresponding branch fluid passage 69 and the supply fluid passage 74. This in turn moves the piston 58 of the second clutch CL2 into the pressing position A1 and engages the second clutch CL2 (see FIG. 5).

As illustrated in FIG. 4, discharging hydraulic fluid from the fluid chamber 67 of the second clutch CL2 through the supply fluid passage 72 disengages the fourth clutch CL4. This discharges hydraulic fluid from the fluid chamber 68 of the second clutch CL2 through the corresponding branch fluid passage 69 and the supply fluid passage 74. This in turn moves the piston 58 of the second clutch CL2 into the intermediate position A3 and disengages the second clutch CL2 (see FIG. 4).

Discharging hydraulic fluid from the fluid chamber 67 of the second clutch CL2 through the supply fluid passage 72 engages the fourth clutch CL4. This supplies hydraulic fluid from the supply fluid passage 74 through the corresponding branch fluid passage 69 into the fluid chamber 68 of the second clutch CL2. This in turn moves the piston 58 of the second clutch CL2 into the separated position A2 and disengages the second clutch CL2 (see FIG. 6).

The above power transmission clutch (that is, the third and fourth clutches CL3 and CL4) includes friction plates 57 configured to transmit motive power, and a piston 58 movable between (i) a pressing position A1, at which the piston 58 presses the friction plates 57 for the power transmission clutch to be engaged to transmit motive power, and (ii) a separated position A2, at which the piston 58 is spaced apart from the friction plates 57 for the power transmission clutch to be disengaged to block motive power, the piston 58 being movable into the pressing position A1 in response to receiving hydraulic fluid to move the piston 58 toward the pressing position A1.

The above hydraulic clutch (that is, the first and second clutches CL1 and CL2) includes friction plates 57 configured to transmit motive power, a piston 58 movable between (i) a pressing position A1, at which the piston 58 presses the friction plates 57 for the power transmission clutch to be engaged to transmit motive power, and (ii) a separated position A2, at which the piston 58 is spaced apart from the friction plates 57 for the power transmission clutch to be disengaged to block motive power, the piston 58 being movable into the pressing position A1 in response to receiving hydraulic fluid to move the piston 58 toward the pressing position A1, and a holder 59 configured to (i) hold the piston 58 at an intermediate position A3 between the pressing position A1 and the separated position A2 in response to the piston 58 coming into contact with the holder 59 and (ii) release the piston 58 from the intermediate position A3.

The above hydraulic clutch may be configured such that the intermediate position A3 is closer to the friction plates 57 relative to a midpoint between the pressing position A1 and the separated position A2.

The above hydraulic clutch may be configured such that the holder 59 is movable between (i) a holding position B1, at which the holder 59 holds the piston 58 at the intermediate position A3, and (ii) an allowing position B2, which is closer to the friction plates 57 relative to the holding position B1 and at which the holder 59 allows the piston 58 to be moved into the pressing position A1.

The above hydraulic clutch further includes a first urging structure (that is, the spring 65) to urge the holder 59 toward the holding position B1, and a second urging structure (that is, the spring 66) to urge the piston 58 toward the pressing position A1 and having an urging force smaller than an urging force of the first urging structure (that is, the spring 65).

The above hydraulic clutch is further configured such that the holder 59 holds the piston 58 at the intermediate position A3 in response to the piston 58 being urged by the second urging structure (that is, the spring 66) toward the pressing position A1 coming into contact with the holder 59 being urged by the first urging structure (that is, the spring 65) into the holding position B1.

The above hydraulic clutch may be configured such that supplying the piston 58 with hydraulic fluid to move the piston 58 toward the pressing position A1 moves the piston 58 into the pressing position A1 against the first urging structure (that is, the spring 65), and the piston 58 moves the holder 59 into the allowing position B2.

The above hydraulic clutch may be configured such that supplying the piston 58 with hydraulic fluid to move the piston 58 toward the separated position A2 moves the piston 58 into the separated position A2 against the second urging structure (that is, the spring 66).

The above hydraulic clutch may include a fluid chamber 68 between the piston 58 and the holder 59, wherein supplying hydraulic fluid into the fluid chamber 68 moves the holder 59 into the allowing position B2 against the first urging structure (that is, the spring 65) and the piston 58 into the separated position A2 against the second urging structure (that is, the spring 66).

As illustrated in FIG. 1, the driver section 9 includes a shift pedal 48 that the driver is able to step on to move it between a stop position and a maximum speed position and that is urged toward the stop position. The driver is able to set the shift pedal 48 in one of first-gear to fourth-gear ranges between the stop position and the maximum speed position. The stop position for the shift pedal 48 corresponds to the minimum speed position within the first-gear range, whereas the maximum speed position for the shift pedal 48 corresponds to the maximum speed position within the fourth-gear range.

Figure 7:
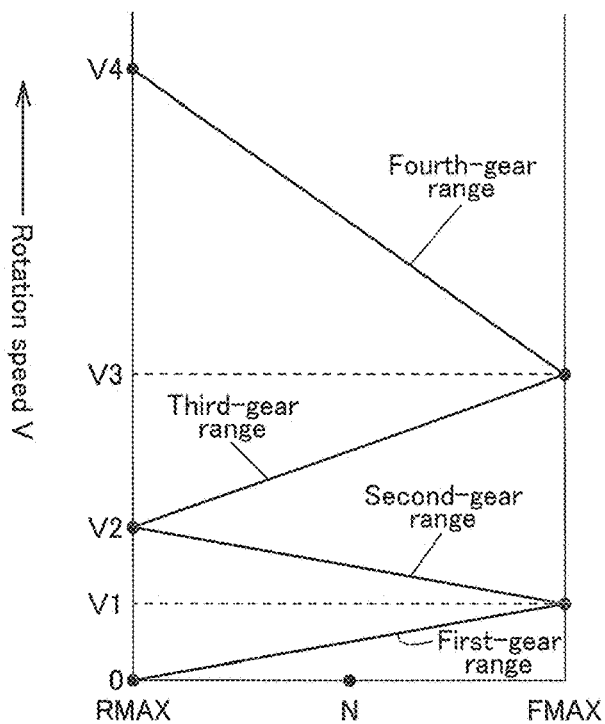
FIG. 7 is a graph that shows the relationship between the rotation speed of an output shaft and the gear position of a continuously variable transmission device.

FIG. 7 illustrates how the continuously variable transmission device 18 is related to the first to fourth clutches CL1 to CL4 in the first-gear to fourth-gear ranges. FIG. 7 shows "V" to indicate the rotation speed of the output shaft 27 (see FIGS. 2 and 3), "N" to indicate the neutral position of the continuously variable transmission device 18, "FMAX" to indicate a forward maximum speed position, and "RMAX" to indicate a reverse maximum speed position.

FIG. 8 shows how the different positions for the shift pedal 48 (that is, the first-gear to fourth-gear ranges) are related to (i) the respective positions of the piston 58 and the holder 59 of the first clutch CL1, (ii) the respective positions of the piston 58 and the holder 59 of the second clutch CL2, (iii) the position of the piston 58 of the third clutch CL3, and (iv) the position of the piston 58 of the fourth clutch CL4.

As described later, moving the shift pedal 48 to the first-gear range engages the first clutch CL1 and operates the continuously variable transmission device 18 between a forward maximum speed position FMAX and a reverse maximum speed position RMAX in accordance with the position of the shift pedal 48.

Moving the shift pedal 48 to the second-gear range engages the second clutch CL2 and operates the continuously variable transmission device 18 between FMAX and RMAX in accordance with the position of the shift pedal 48.

As described later, moving the shift pedal 48 to the third-gear range engages the third clutch CL3 and operates the continuously variable transmission device 18 between FMAX and RMAX in accordance with the position of the shift pedal 48.

Moving the shift pedal 48 to the fourth-gear range engages the fourth clutch CL4 and operates the continuously variable transmission device 18 between FMAX and RMAX in accordance with the position of the shift pedal 48.

Moving the shift pedal 48 to the stop position discharges hydraulic fluid from the supply fluid passages 71 to 74 and the branch fluid passages 69 as illustrated in FIG. 3 and operates the continuously variable transmission device 18 to RMAX.

As illustrated in FIG. 8, moving the shift pedal 48 to the stop position moves each of the respective pistons 58 of the first and second clutches CL1 and CL2 into the intermediate position A3, each of the respective holders 59 of the first and second clutches CL1 and CL2 into the holding position B1 (see also FIG. 4), and each of the respective pistons 58 of the third and fourth clutches CL3 and CL4 into the separated position A2. This disengages the first to fourth clutches CL1 to CL4.

Moving the shift pedal 48 to the first-gear range supplies hydraulic fluid into the supply fluid passage 71 and discharges hydraulic fluid from the supply fluid passages 72, 73, and 74 and the branch fluid passages 69 as illustrated in FIG. 3.

As illustrated in FIG. 8, moving the shift pedal 48 to the first-gear range moves the piston 58 of the first clutch CL1 into the pressing position A1, the holder 59 thereof into the allowing position B2 (see also FIG. 5), the piston 58 of the second clutch CL2 into the intermediate position A3, the holder 59 thereof into the holding position B1 (see also FIG. 4), and each of the respective pistons 58 of the third and fourth clutches CL3 and CL4 into the separated position A2. This engages the first clutch CL1 and disengages the second to fourth clutches CL2 to CL4.

As illustrated in FIG. 2, in response to the first clutch CL1 becoming engaged, the motive power composited by the first and second planetary devices 40 and 50 is transmitted from the ring gear 52 of the second planetary device 50 through the first clutch CL1 to the output shaft 27.

In the above state, the shift pedal 48 operates the continuously variable transmission device 18 to RMAX at the minimum speed position within the first-gear range (that is, the stop position for the shift pedal 48) and to FMAX at the maximum speed position within the first-gear range, and varies the continuously variable transmission device 18 between RMAX and FMAX to change the rotation speed V of the output shaft 27 continuously between zero speed and a speed V1, as shown with "First-gear range" in FIG. 7.

Moving the shift pedal 48 to the second-gear range supplies hydraulic fluid into the supply fluid passage 72 and discharges hydraulic fluid from the supply fluid passages 71, 73, and 74 and the branch fluid passages 69 as illustrated in FIG. 3.

As illustrated in FIG. 8, moving the shift pedal 48 to the second-gear range moves the piston 58 of the first clutch CL1 into the intermediate position A3, the holder 59 thereof into the holding position B1 (see also FIG. 4), the piston 58 of the second clutch CL2 into the pressing position A1, the holder 59 thereof into the allowing position B2 (see also FIG. 5), and each of the respective pistons 58 of the third and fourth clutches CL3 and CL4 into the separated position A2. This engages the second clutch CL2 and disengages the first, third, and fourth clutches CL1, CL3, and CL4.

As illustrated in FIG. 2, in response to the second clutch CL2 becoming engaged, the motive power composited by the first and second planetary devices 40 and 50 is transmitted from the sun gear 51 of the second planetary device 50 through the second clutch CL2 to the output shaft 27.

In the above state, the shift pedal 48 operates the continuously variable transmission device 18 to FMAX at the minimum speed position within the second-gear range and to RMAX at the maximum speed position within the second-gear range, and varies the continuously variable transmission device 18 between FMAX and RMAX to change the rotation speed V of the output shaft 27 continuously between the speed V1 and a speed V2, as shown with "Second-gear range" in FIG. 7.

Moving the shift pedal 48 to the third-gear range supplies hydraulic fluid into the supply fluid passage 73 and discharges hydraulic fluid from the supply fluid passages 71, 72, and 74 and the branch fluid passages 69 as illustrated in FIG. 3.

As illustrated in FIG. 8, moving the shift pedal 48 to the third-gear range moves each of the respective pistons 58 of the first and second clutches CL1 and CL2 into the intermediate position A3, each of the respective holders 59 of the first and second clutches CL1 and CL2 into the holding position B1 (see also FIG. 4), the piston 58 of the third clutch CL3 into the pressing position A1, and the piston 58 of the fourth clutch CL4 into the separated position A2. This engages the third clutch CL3 and disengages the first, second, and fourth clutches CL1, CL2, and CL4.

As illustrated in FIG. 2, in response to the third clutch CL3 becoming engaged, the motive power composited by the first and second planetary devices 40 and 50 is transmitted from the carrier 55 through the third clutch CL3 to the output shaft 27.

In the above state, the shift pedal 48 operates the continuously variable transmission device 18 to RMAX at the minimum speed position within the third-gear range and to FMAX at the maximum speed position within the third-gear range, and varies the continuously variable transmission device 18 between RMAX and FMAX to change the rotation speed V of the output shaft 27 continuously between the speed V2 and a speed V3, as shown with "Third-gear range" in FIG. 7.

Moving the shift pedal 48 to the fourth-gear range supplies hydraulic fluid into the supply fluid passage 74 and the branch fluid passages 69 and discharges hydraulic fluid from the supply fluid passages 71, 72, and 73 as illustrated in FIG. 3.

As illustrated in FIG. 8, moving the shift pedal 48 to the fourth-gear range moves each of the respective pistons 59 of the first and second clutches CL1 and CL2 into the separated position A2, each of the respective holders 58 of the first and second clutches CL1 and CL2 into the allowing position B2 (see also FIG. 6), the piston 58 of the third clutch CL3 into the separated position A2, and the piston 58 of the fourth clutch CL4 into the pressing position A1. This engages the fourth clutch CL4 and disengages the first to third clutches CL1 to CL3.

As illustrated in FIG. 2, in response to the fourth clutch CL4 becoming engaged, the motive power composited by the first and second planetary devices 40 and 50 is transmitted from the sun gear 51 of the second planetary device 50 through the fourth clutch CL4 to the output shaft 27.

In the above state, the shift pedal 48 operates the continuously variable transmission device 18 to FMAX at the minimum speed position within the fourth-gear range and to RMAX at the maximum speed position within the fourth-gear range (that is, the maximum speed position for the shift pedal 48), and varies the continuously variable transmission device 18 between FMAX and RMAX to change the rotation speed V of the output shaft 27 continuously between the speed V3 and a speed V4, as shown with "Fourth-gear range" in FIG. 7.

The above travel power transmission device may be configured such that an operation section (that is, the branch fluid passages 69) configured to cause the holder 59 of the hydraulic clutch (that is, the first and second clutches CL1 and CL2) to hold the piston 58 of the hydraulic clutch (that is, the first and second clutches CL1 and CL2) at the intermediate position A3 in response to engagement of the power transmission clutch (that is, the third clutch CL3) of a power transmission system among the plurality of power transmission systems of which power transmission system (that is, the input gear 63) the power transmission rate is next to the power transmission rate of a power transmission system among the plurality of power transmission systems which power transmission system (that is, the input gears 61 and 62) includes the hydraulic clutch (that is, the first and second clutches CL1 and CL2).

The above travel power transmission device may be configured such that the operation section (that is, the branch fluid passages 69) is configured to: (i) in response to engagement of the power transmission clutch (that is, the first clutch CL1) of a power transmission system among the plurality of power transmission systems which power transmission system (that is, the input gear 61) is configured for a lowest speed step (that is, the first-gear step) among the speed change steps, cause the holder 59 of the hydraulic clutch (that is, the second clutch CL2) to hold the piston 58 of the hydraulic clutch (that is, the second clutch CL2) at the intermediate position A3, the hydraulic clutch (that is, the second clutch CL2) being of a power transmission system among the plurality of power transmission systems which power transmission system (that is, the input gear 62) is configured for a speed change step (that is, the second-gear step) next to the lowest speed step (that is, the first-gear step) on a high-speed side.

The above travel power transmission device is further configured such that the operation section (that is, the branch fluid passages 69) is configured to: (ii) in response to engagement of the power transmission clutch (that is, the third clutch CL3) of a power transmission system among the plurality of power transmission systems which power transmission system (that is, the input gear 63) is configured for a speed change step (that is, the third-gear step) on the high-speed side of the power transmission system (that is, the input gear 61) configured for the lowest speed step (that is, the first-gear step), cause the holder 59 of the hydraulic clutch (that is, the second clutch CL2) to hold the piston 58 of the hydraulic clutch (that is, the second clutch CL2) at the intermediate position A3, the hydraulic clutch (that is, the second clutch CL2) being of a power transmission system among the plurality of power transmission systems which power transmission system (that is, the input gear 62) is configured for a speed change step (that is, the second-gear step) next, on a low-speed side, to the speed change step (that is, the third-gear step) of the power transmission system (that is, the input gear 63) of which the power transmission clutch (that is, the third clutch CL3) is engaged.

The above travel power transmission device may include a power transmission system among the plurality of power transmission systems which power transmission system (that is, the input gear 64) is configured for a high-speed-region high-speed step (that is, the fourth-gear step) on the high-speed side of a power transmission system the among of power plurality transmission systems which power transmission system (that is, the input gear 63) is configured for a lowest speed change step (that is, the third-gear step) among the at least one speed change step (that is, the third-gear and fourth-gear steps) within the high-speed region.

The above travel power transmission device is further configured such that the operation section (that is, the branch fluid passages 69) is configured to not hold the piston 58 of the hydraulic clutch (that is, the first and second clutches CL1 and CL2) of the power transmission system (that is, the input gears 61 and 62) configured for the at least one speed change step (that is, the first-gear and second-gear steps) within the low-speed region at the intermediate position A3 in response to engagement of the power transmission clutch (that is, the fourth clutch CL4) of the power transmission system (that is, the input gear 64) configured for the high-speed-region high-speed step (that is, the fourth-gear step).

The above travel power transmission device may be configured such that the operation section (that is, the branch fluid passages 69) includes a branch fluid passage 69 branching from a supply fluid passage 74 configured to supply hydraulic fluid to move, toward the pressing position A1, the piston 58 of the power transmission clutch (that is, the fourth clutch CL4) of the power transmission system (that is, the input gear 64) configured for the high-speed-region high-speed step (that is, the fourth-gear step), the branch fluid passage 69 being connected to the fluid chamber 68 to supply a portion of the hydraulic fluid from the supply fluid passage 74 into the fluid chamber 68.

The above work vehicle (that is, the tractor) includes a motive power source (that is, the engine 1), a travel device (that is, the front and rear wheels 6 and 7), and a power transmission system (that is, the input gears 61 and 62) to transmit motive power from the motive power source (that is, the engine 1) to the travel device (that is, the front and rear wheels 6 and 7), the power transmission system (that is, the input gears 61 and 62) including a hydraulic clutch (that is, the first and second clutches CL1 and CL2).

The above work vehicle (that is, the tractor) includes a motive power source (that is, the engine 1), a travel device (that is, the front and rear wheels 6 and 7), and a travel power transmission device 19, the travel power transmission device 19 being operable to transmit motive power from the motive power source (that is, the engine 1) to the travel device (that is, the front and rear wheels 6 and 7).

First Alternative Example Embodiment

The branch fluid passages 69 illustrated in FIGS. 3 to 6 may be replaced with a fluid passage (not illustrated in the drawings) and a control valve (not illustrated in the drawings) each configured to supply hydraulic fluid into and discharge hydraulic fluid from the fluid chamber 68 of the first clutch CL1 and a fluid passage (not illustrated in the drawings) and a control valve (not illustrated in the drawings) each configured to supply hydraulic fluid into and discharge hydraulic fluid from the fluid chamber 68 of the second clutch CL2.

The above configuration involves four control valves configured to supply hydraulic fluid into and discharge hydraulic fluid from the respective supply fluid passages 71 to 74 and two more control valves configured to supply hydraulic fluid into and discharge hydraulic fluid from the respective fluid chambers 68 of the first and second clutches CL1 and CL2. Using these control valves allows the operations shown in FIG. 8.

The above configuration involves, as an operation section, fluid passages and control valves configured to supply hydraulic fluid into and discharge hydraulic fluid from the respective fluid chambers 68 of the first and second clutches CL1 and CL2.

Second Alternative Example Embodiment

The first to fourth clutches CL1 to CL4 illustrated in FIGS. 2 and 3 may be altered such that only one of the first to fourth clutches CL1 to CL4 includes a holder 59 and is configured such that its piston 58 is placeable at the intermediate position A3 and that the other three each do not include a holder 59 and are each configured such that its piston 58 is not placeable at the intermediate position A3.

The first to fourth clutches CL1 to CL4 illustrated in FIGS. 2 and 3 may be altered such that three of the first to fourth clutches CL1 to CL4 each include a holder 59 and are each configured such that its piston 58 is placeable at the intermediate position A3 and that the other one does not include a holder 59 and is configured such that its piston 58 is not placeable at the intermediate position A3.

The first to fourth clutches CL1 to CL4 illustrated in FIGS. 2 and 3 may be altered such that each of the first to fourth clutches CL1 to CL4 includes a holder 59 and is configured such that its piston 58 is placeable at the intermediate position A3.

Third Alternative Example Embodiment

The configuration of the second alternative example embodiment may preferably be combined with the first alternative example embodiment.

Fourth Alternative Example Embodiment

The power transmission device 19 may include, in addition to the four power transmission systems, one or more additional power transmission systems each including a power transmission clutch (that is, a hydraulic clutch).

If the power transmission device 19 illustrated in FIGS. 2 and 3 includes, for example, five power transmission systems, this example embodiment may be configured such that the first and second speed steps are each for a power transmission system of a speed change step within a low-speed region, whereas the third to fifth speed steps are each for a power transmission system of a speed change step within a high-speed region. This example embodiment may, in this case, be configured such that engaging the power transmission clutch of the fourth or fifth speed change step moves, to the intermediate position A3, each of the respective pistons 58 of the first and second clutches CL1 and CL2 for the respective power transmission systems of the first and second speed steps.

If the power transmission device 19 illustrated in FIGS. 2 and 3 includes, for example, five power transmission systems, this example embodiment may be configured such that the first to third speed steps are each for a power transmission system of a speed change step within a low-speed region, whereas the fourth and fifth speed steps are each for a power transmission system of a speed change step within a high-speed region. This example embodiment may, in this case, be configured such that engaging the power transmission clutch of the fifth speed change step moves, to the intermediate position A3, each of the respective pistons 58 of the first to third clutches CL1 to CL3 for the respective power transmission systems of the first to third speed steps.

Fifth Alternative Example Embodiment

The first and second clutches CL1 and CL2 may be configured such that the intermediate position A3 is at the midpoint between the pressing position A1 and the separated position A2 or farther from the friction plates 57 relative to the midpoint between the pressing position A1 and the separated position A2.

The above hydraulic clutch may be configured such that the intermediate position A3 is farther from the friction plates 57 relative to a midpoint between the pressing position A1 and the separated position A2.

Sixth Alternative Example Embodiment

The first and second clutches CL1 and CL2 may be configured such that the first clutch CL1 has an intermediate position A3 spaced farther from the friction plates 57 relative to the midpoint between the pressing position A1 and the separated position A2 and that the second clutch CL2 has an intermediate position A3 closer to the friction plates 57 relative to the midpoint between the pressing position A1 and the separated position A2.

The first and second clutches CL1 and CL2 may be configured such that the first clutch CL1 has an intermediate position A3 closer to the friction plates 57 relative to the midpoint between the pressing position A1 and the separated position A2 and that the second clutch CL2 has an intermediate position A3 farther from the friction plates 57 relative to the midpoint between the pressing position A1 and the separated position A2.

The first and second clutches CL1 and CL2 may have respective intermediate positions A3 that are both closer to the friction plates 57 relative to the midpoint between the pressing position A1 and the separated position A2 and that are positioned differently.

The first and second clutches CL1 and CL2 may have respective intermediate positions A3 that are both farther from the friction plates 57 relative to the midpoint between the pressing position A1 and the separated position A2 and that are positioned differently.

Seventh Alternative Example Embodiment

The transmission case 3 may contain no first and second planetary devices 40 and 50 illustrated in FIG. 2 and contain two or more power transmission devices 19 connected to each other in series as travel power transmission systems.

The transmission case 3 may, with two or more power transmission devices 19 connected to each other in series, contain a power transmission device 19 including power transmission systems in a number different from the number of power transmission systems of another power transmission device 19. This example embodiment may, in this case, be configured such that a power transmission device 19 including a large number of power transmission systems is a main power transmission device 19, whereas a power transmission device 19 including a small number of power transmission systems is an auxiliary power transmission device 19.

Eighth Alternative Example Embodiment

The tractor may include a motor (not illustrated in the drawings) instead of the engine 1 as a motive power source. The tractor may include an engine 1 and a motor in combination as a hybrid motive power source.

Ninth Alternative Example Embodiment

The tractor may include crawler travel devices instead of the rear wheels 7 as rear travel devices. The tractor, in this case, includes a pair of left and right front wheels 6 as front travel devices and a pair of left and right crawler travel devices as rear travel devices.

The tractor may include a pair of left and right crawler travel devices instead of the front wheels 6 and another pair of left and right crawler travel devices instead of the rear wheels 7.

Example embodiments of the present invention are applicable to not only tractors but also agricultural work vehicles such as combines and riding-type rice transplanters as well as hydraulic clutches and travel power transmission devices for such agricultural work vehicles. Example embodiment of the present invention are also applicable to construction work vehicles such as backhoes and wheel loaders as well as hydraulic clutches and travel power transmission devices for such construction work vehicles.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic clutch, comprising:
   friction plates to transmit motive power;
   a piston movable between (i) a pressing position, at which the piston presses the friction plates for the hydraulic clutch to be engaged to transmit motive power, and (ii) a separated position, at which the piston is spaced apart from the friction plates for the hydraulic clutch to be disengaged to block motive power, the piston being movable into the pressing position in response to receiving hydraulic fluid to move the piston toward the pressing position; and
   a holder to (i) hold the piston at an intermediate position between the pressing position and the separated position in response to the piston coming into contact with the holder and (ii) release the piston from the intermediate position; wherein
   the holder is movable between (i) a holding position, at which the holder holds the piston at the intermediate position, and (ii) an allowing position, which is closer to the friction plates relative to the holding position and at which the holder allows the piston to be moved into the pressing position;
   the hydraulic clutch further comprises:
      a first urging structure to urge the holder toward the holding position; and
      a second urging structure to urge the piston toward the pressing position with an urging force smaller than an urging force of the first urging structure; and
   the holder is operable to hold the piston at the intermediate position in response to the piston being urged by the second urging structure toward the pressing position coming into contact with the holder that is being urging by the first urging structure into the holding position.

2. The hydraulic clutch according to claim 1, wherein the intermediate position is closer to the friction plates relative to a midpoint between the pressing position and the separated position.

3. The hydraulic clutch according to claim 1, wherein the intermediate position is farther from the friction plates relative to a midpoint between the pressing position and the separated position.

4. The hydraulic clutch according to claim 1, wherein supplying the piston with hydraulic fluid to move the piston toward the pressing position moves the piston into the pressing position against the first urging structure, and the piston moves the holder into the allowing position.

5. The hydraulic clutch according to claim 1, wherein supplying the piston with hydraulic fluid to move the piston toward the separated position moves the piston into the separated position against the second urging structure.

6. The hydraulic clutch according to claim 5, further comprising:
   a fluid chamber between the piston and the holder; wherein
   supplying hydraulic fluid into the fluid chamber moves the holder into the allowing position against the first urging structure and the piston into the separated position against the second urging structure.

7. A work vehicle, comprising:
   a motive power source;
   a travel device; and
   a power transmission system to transmit motive power from the motive power source to the travel device, the power transmission system including the hydraulic clutch according to claim 1.

8. A travel power transmission device, comprising:
   a plurality of power transmission systems configured for respective speed change steps with respective power transmission rates different from each other; and a plurality of power transmission clutches for the respective power transmission systems, each power transmission clutch of the plurality of power transmission clutches including:
  friction plates to transmit motive power; and
  a piston movable between (i) a pressing position, at which the piston presses the friction plates for the power transmission clutch to be engaged to transmit motive power, and (ii) a separated position, at which the piston is spaced apart from the friction plates for the power transmission clutch to be disengaged to block motive power, the piston being movable into the pressing position in response to receiving hydraulic fluid to move the piston toward the pressing position; wherein
at least one of the plurality of power transmission clutches is the hydraulic clutch according to claim 1.

9. A work vehicle, comprising:
a motive power source;
a travel device; and
the travel power transmission device according to claim 8 to transmit motive power from the motive power source to the travel device.

10. The travel power transmission device according to claim 8, wherein
at least one of the plurality of power transmission systems includes at least one speed change step within a low-speed region and at least one speed change step within a high-speed region; and
the power transmission clutch provided in the at least one of the plurality of power transmission systems for the at least one speed change step within the low-speed region is the hydraulic clutch.

11. The travel power transmission device according to claim 8, further comprising:
an operation section operable to cause the holder of the hydraulic clutch to hold the piston of the hydraulic clutch at the intermediate position in response to engagement of the power transmission clutch of a power transmission system among the plurality of power transmission systems of which power transmission system the power transmission rate is next to the power transmission rate of a power transmission system among the plurality of power transmission systems which power transmission system includes the hydraulic clutch.

12. A travel power transmission device, comprising:
a plurality of power transmission systems configured for respective speed change steps with respective power transmission rates different from each other; and
a plurality of power transmission clutches for the respective power transmission systems, each power transmission clutch of the plurality of power transmission clutches including:
  friction plates to transmit motive power; and
  a piston movable between (i) a pressing position, at which the piston presses the friction plates for the power transmission clutch to be engaged to transmit motive power, and (ii) a separated position, at which the piston is spaced apart from the friction plates for the power transmission clutch to be disengaged to block motive power, the piston being movable into the pressing position in response to receiving hydraulic fluid to move the piston toward the pressing position; wherein
at least one of the plurality of power transmission clutches is a hydraulic clutch that includes a holder to (i) hold the piston at an intermediate position between the pressing position and the separated position in response to the piston coming into contact with the holder and (ii) release the piston from the intermediate position;
at least one of the plurality of power transmission systems includes at least one speed change step within a low-speed region and at least one speed change step within a high-speed region;
the power transmission clutch provided in the at least one of the plurality of power transmission systems for the at least one speed change step within the low-speed region is the hydraulic clutch;
the pressing position and the separated position are separated from each other by a gap that is smaller for the power transmission clutch of a power transmission system among the plurality of power transmission systems which power transmission system is configured for the at least one speed change step within the high-speed region than for the hydraulic clutch of the power transmission system configured for the at least one speed change step within the low-speed region.

13. A travel power transmission device, comprising:
a plurality of power transmission systems configured for respective speed change steps with respective power transmission rates different from each other; and
a plurality of power transmission clutches for the respective power transmission systems, each power transmission clutch of the plurality of power transmission clutches including:
  friction plates to transmit motive power; and
  a piston movable between (i) a pressing position, at which the piston presses the friction plates for the power transmission clutch to be engaged to transmit motive power, and (ii) a separated position, at which the piston is spaced apart from the friction plates for the power transmission clutch to be disengaged to block motive power, the piston being movable into the pressing position in response to receiving hydraulic fluid to move the piston toward the pressing position; and
an operation section; wherein
at least one of the plurality of power transmission clutches is a hydraulic clutch that includes a holder to (i) hold the piston at an intermediate position between the pressing position and the separated position in response to the piston coming into contact with the holder and (ii) release the piston from the intermediate position;
the operation section is operable to cause the holder of the hydraulic clutch to hold the piston of the hydraulic clutch at the intermediate position in response to engagement of the power transmission clutch of a power transmission system among the plurality of power transmission systems of which power transmission system the power transmission rate is next to the power transmission rate of a power transmission system among the plurality of power transmission systems which power transmission system includes the hydraulic clutch; and
the operation section is operable to:
(i) in response to engagement of the power transmission clutch of a power transmission system among the plurality of power transmission systems which power transmission system is configured for a lowest speed step among the speed change steps, cause the holder of the hydraulic clutch to hold the piston of the hydraulic clutch at the intermediate position, the hydraulic clutch being of a power transmission system among the plurality of power transmission systems which power transmission system is configured for a speed change step next to the lowest speed step on a high-speed side; and (ii) in response to engagement of the power transmission clutch of a power transmission system among the plurality of power transmission systems which power transmission system is configured for a speed change step on the high-speed side of the power transmission system configured for the lowest speed step, cause the holder of the hydraulic clutch to hold the piston of the hydraulic clutch at the intermediate position, the hydraulic clutch being of a power transmission system among the plurality of power transmission systems which power transmission system is configured for a speed change step next, on a low-speed side, to the speed change step of the power transmission system of which the power transmission clutch is engaged.

14. The travel power transmission device according to claim 13, wherein
at least one of the plurality of power transmission systems includes at least one speed change step within a low-speed region and at least one speed change step within a high-speed region;
the power transmission clutch provided in the at least one of the plurality of power transmission systems for the at least one speed change step within the low-speed region is the hydraulic clutch; and
for a power transmission system among the plurality of power transmission systems which power transmission system is configured for a high-speed-region high-speed step on the high-speed side of a power transmission system among the plurality of power transmission systems which power transmission system is configured for a lowest speed change step among the at least one speed change step within the high-speed region, the operation section is configured to not hold the piston of the hydraulic clutch of the power transmission system configured for the at least one speed change step within the low-speed region at the intermediate position in response to engagement of the power transmission clutch of the power transmission system configured for the high-speed-region high-speed step.

15. The travel power transmission device according to claim 14, wherein
the hydraulic clutch of the power transmission system configured for the at least one speed change step within the low-speed region is the hydraulic clutch according to claim 7; and
the operation section includes a branch fluid passage branching from a supply fluid passage to supply hydraulic fluid to move, toward the pressing position, the piston of the power transmission clutch of the power transmission system configured for the high-speed-region high-speed step, the branch fluid passage being connected to the fluid chamber to supply a portion of the hydraulic fluid from the supply fluid passage into the fluid chamber.

* * * * *